(12) United States Patent
Mohideen et al.

(10) Patent No.: US 12,147,317 B1
(45) Date of Patent: Nov. 19, 2024

(54) BACKUP AND RESTORE OF CLIENT-MANAGED AND SYSTEM-MANAGED DATABASE TABLES

(71) Applicant: Amazon Technologies, Inc., Seattle, WA (US)

(72) Inventors: Saleem Mohideen, Saratoga, CA (US); Shanpei Zhou, Seattle, WA (US); Li-Che Hsiao, Seattle, WA (US); Benjamin S Ellis, Seattle, WA (US); Raman Mittal, Kirkland, WA (US); Peng Gu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/937,434

(22) Filed: Sep. 30, 2022

(51) Int. Cl.
 *G06F 7/00* (2006.01)
 *G06F 11/14* (2006.01)
(52) U.S. Cl.
 CPC ...... *G06F 11/1471* (2013.01); *G06F 11/1469* (2013.01)
(58) Field of Classification Search
 CPC .................. G06F 11/1471; G06F 11/1469
 USPC .................................. 707/600–899
 See application file for complete search history.

(56) References Cited

U.S. PATENT DOCUMENTS

| | | | |
|---|---|---|---|
| 1,146,803 A | 7/1915 | Larson | |
| 7,299,378 B2 | 11/2007 | Chandrasekaran | |
| 8,228,954 B2 | 7/2012 | Thubert | |
| 8,266,101 B1 | 9/2012 | Shuai | |
| 9,501,507 B1 | 11/2016 | Harris | |
| 9,575,849 B2 | 2/2017 | Mittal | |
| 9,792,315 B2 | 10/2017 | Goel | |
| 10,013,449 B1 | 7/2018 | Xiao | |
| 10,255,237 B2 | 4/2019 | Johnson | |
| 10,382,445 B1 | 8/2019 | Mantel | |
| 10,909,143 B1 | 2/2021 | Brahmadesam | |
| 11,372,856 B2 | 6/2022 | George | |
| 11,455,290 B1 | 9/2022 | Brahmadesam | |
| 11,743,325 B1 | 8/2023 | Dunsmore | |
| 2002/0198858 A1 | 12/2002 | Stanley | |

(Continued)

OTHER PUBLICATIONS

U.S. Appl. No. 17/937,424, filed Sep. 30, 2022, Aravind Kumar, et al.

(Continued)

*Primary Examiner* — Isaac M Woo
(74) *Attorney, Agent, or Firm* — S. Scott Foster; Kowert, Hood, Munyon, Rankin & Goetzel, P.C.

(57) ABSTRACT

Backup and restore of client-managed tables and system-managed tables in a same database may be performed. A request to restore a database with both a client-managed table and system-managed table may be received. The request may specify a point in time to restore the database. A metadata volume for the database that describes both the client-managed table and the system-managed table may be restored and used to identify the volumes for both the client-managed table and shards of the system-managed table. Redo logs for each of the volumes may be used according to timestamps that are synchronized according to a time synchronization service to generate restored versions of the volumes for the client-managed table and the shards of the system-managed table from backup copies, which can then be made available for accessing the database.

20 Claims, 22 Drawing Sheets

(56) References Cited

U.S. PATENT DOCUMENTS

| | | | |
|---|---|---|---|
| 2003/0212650 A1 | 11/2003 | Adler | |
| 2009/0077135 A1 | 3/2009 | Yalamanchi | |
| 2009/0132471 A1 | 5/2009 | Brown | |
| 2009/0132536 A1 | 5/2009 | Brown | |
| 2009/0307287 A1 | 12/2009 | Barsness | |
| 2010/0125584 A1 | 5/2010 | Navas | |
| 2013/0080388 A1 | 3/2013 | Dwyer | |
| 2015/0264523 A1 | 9/2015 | Xu | |
| 2016/0350392 A1 | 12/2016 | Rice | |
| 2017/0075965 A1 | 3/2017 | Liu | |
| 2017/0103094 A1 | 4/2017 | Hu | |
| 2017/0177658 A1 | 6/2017 | Lee | |
| 2017/0293635 A1 | 10/2017 | Peterson | |
| 2018/0060395 A1 | 3/2018 | Pathak | |
| 2021/0034605 A1 | 2/2021 | Cai | |
| 2021/0103586 A1 | 4/2021 | Quamar | |
| 2021/0173831 A1 | 6/2021 | Crabtree | |
| 2021/0389883 A1* | 12/2021 | Derryberry | G06F 11/2094 |
| 2022/0229822 A1 | 7/2022 | Guo | |
| 2023/0195744 A1 | 6/2023 | Owenm | |
| 2023/0385353 A1 | 11/2023 | Prateek | |

OTHER PUBLICATIONS

U.S. Appl. No. 17/937,435, filed Sep. 30, 2022, Jan Engelsberg, et al.
U.S. Appl. No. 17/937,430, filed Sep. 30, 2022, Alexandre Olegovich Verbitski, et al.
U.S. Appl. No. 17/937,426, filed Sep. 30, 2022, Saleem Mohideen, et al.

* cited by examiner

BACKUP AND RESTORE OF CLIENT-MANAGED AND SYSTEM-MANAGED DATABASE TABLES

BACKGROUND

Commoditization of computer hardware and software components has led to the rise of service providers that provide computational and storage capacity as a service. At least some of these services (e.g., managed services such as managed relational database services) can be difficult to scale, including scaling the processing capacity. Disruption of an application or other process can be a high cost associated with changing capacity to better match workloads, as client applications may be interrupted due to dropped connections (and may not even retry to connect, in some instances). Techniques that can support scaling resources to match workloads therefore are highly desirable.

Figure 1:
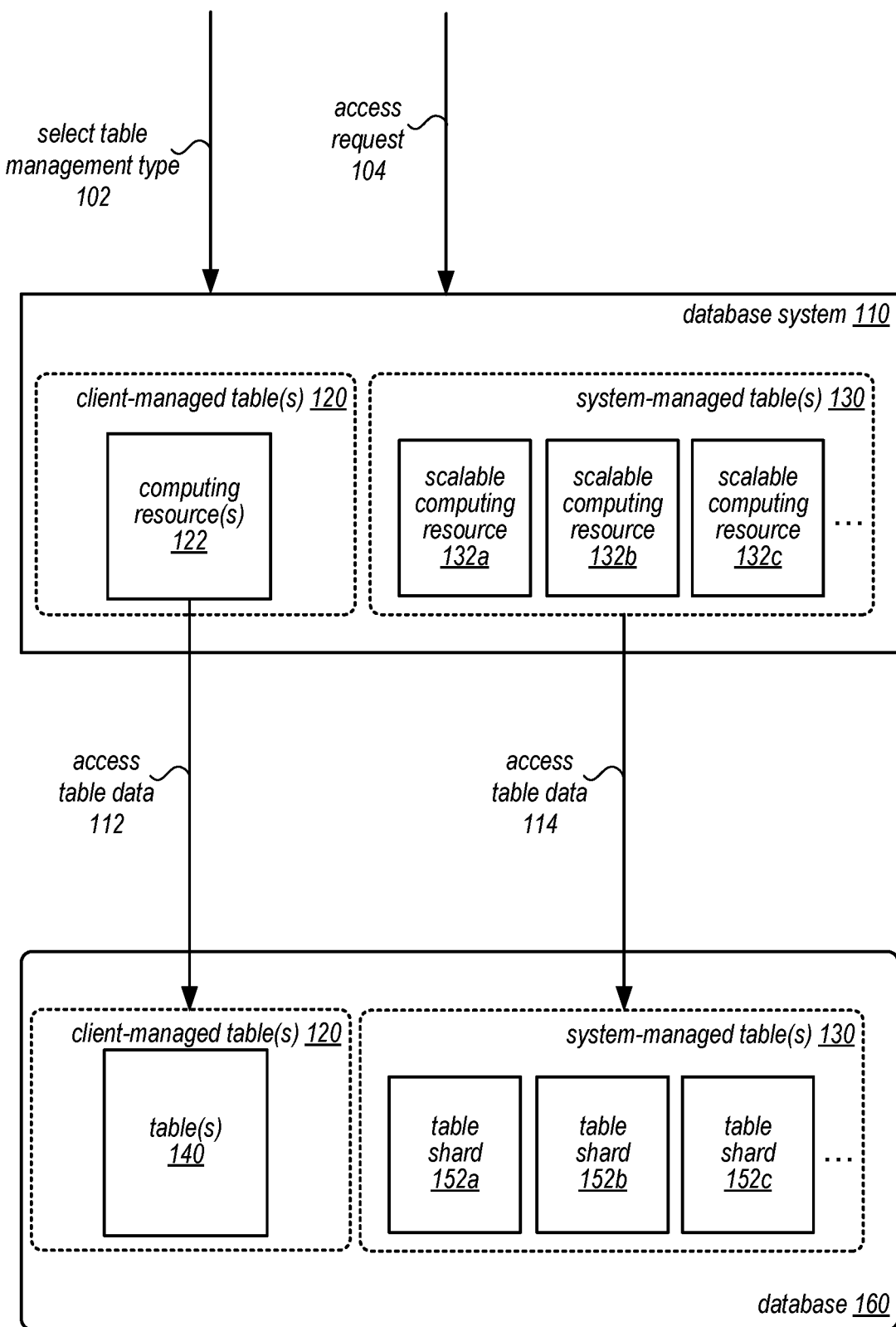
FIG. 1 is a logical block diagram illustrating a database system that supports both a client-managed table and system-managed table in a common database.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein.

Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Techniques for a database system that supports both a client-managed table and system-managed table in a common database are described herein. While some database systems offer database management features to scale database resources to meet different workloads, these techniques may require such techniques to be performed in a database wide manner. While this may be efficient in some scenarios, not all tables in a database may benefit from these managed implementations. In various embodiments, however, different management types for individual tables in a database may be supported. In this way, one table that utilizes large amounts of storage with high workloads can be managed by a database system, to provide a "limitless" table experience to client applications. Such "limitless" tables, also referred to as system-managed tables, allow users of the database to focus development on a client application without having to build and managed capacity and computing resources for such tables, without requiring that all tables in the database be managed in such a fashion.

FIG. 1 is a logical block diagram illustrating a database system that supports both a client-managed table and a system-managed table in a common database. Database system 110 may be a database system that is standalone for a single database or a database system that is a database service, like database service 210 discussed below. Database system 110 may implement both client-managed tables 120 and system-managed tables 130 in a same database 160. Client-managed database table(s) 120 may allow client applications to control the management and resource allocation of computing resource(s) 122 (e.g., a database node, cluster, or other data processing component) utilized to access the table(s) 140, whereas system-managed table(s) 130 may be managed by database system 110 directly to adjust scalable computing resources 132a, 132b, and 132c (e.g., one or more database nodes, clusters, or other data processing components). Client managed table(s) 120 may be stored as table(s) 140 in the database, assigned to and accessed by computing resource(s) 122, whereas system-managed table(s) 130 may be stored as table shards 152a, 152b, and 152c, which may distribute data for the system-managed table across different locations and in various alignments or other optimized configurations as discussed below in order to optimize access request processing.

Database system 110 may support requests to select the table management type in order to allow for different configurations of individual tables in database 160. For example, a system-managed table may be appropriate for tables workload or storage requirements can exceed the capacities of individual computing resources to access, store, or manage in a client-managed type.

When access requests are received, such as access request 104, database system may intelligently route the query to different resources 122 and 132a through 132c. For example, one or more routers, as discussed in detail below, may be implemented that can parse, analyze (and plan and execute if appropriate) queries for database 160 utilizing the different computing resources and selecting the appropriate transaction protocols.

Please note, FIG. 1 is provided as a logical illustration of database instances and hosts, and is not intended to be limiting as to the physical arrangement, size, or number of components, modules, or devices to implement such features.

The specification continues with a description of an example network-based database service that supports both a client-managed table and system-managed table in a common database. Included in the description of the example network-based database service are various aspects of the example network-based database service, such as a database node, router, metadata service, control plane, and a storage service. The specification then describes flowcharts of various embodiments of methods for supporting both a client-managed table and system-managed table in a common database. Next, the specification describes an example system that may implement the disclosed techniques. Various examples are provided throughout the specification.

Figure 2:
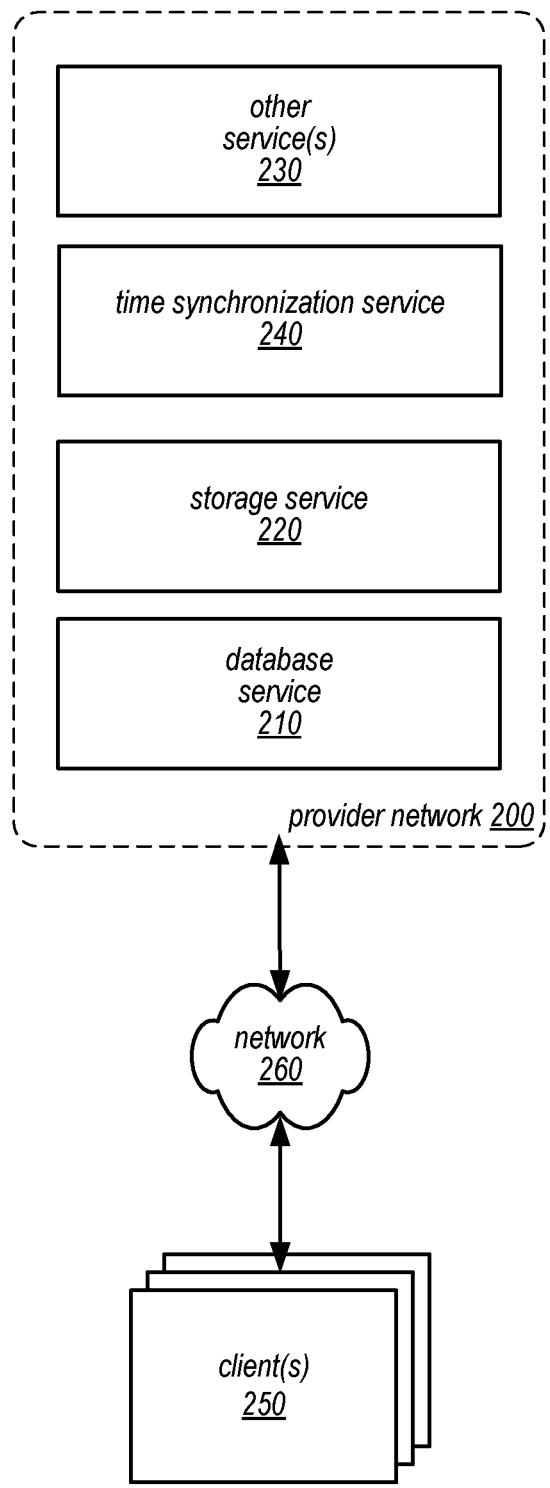
FIG. 2 is a block diagram illustrating a provider network that may implement a database service that supports both a client-managed table and system-managed table in a common database, according to some embodiments.

FIG. 2 is a block diagram illustrating a provider network that may implement a database service that supports both a client-managed table and system-managed table in a common database, according to some embodiments. A provider network, such as provider network 200, may be a private or closed system or may be set up by an entity such as a company or a public sector organization to provide one or more services (such as various types of cloud-based storage) accessible via the Internet and/or other networks to clients 250, in some embodiments. The provider network 200 may be implemented in a single location or may include numerous provider network regions that may include one or more data centers hosting various resource pools, such as collections of physical and/or virtualized computer servers, storage devices, networking equipment and the like (e.g., computing system 3000 described below with regard to FIG. 22), needed to implement and distribute the infrastructure and storage services offered by the provider network within the provider network regions.

For example, provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In the illustrated embodiment, a number of clients (shown as clients 250 may interact with a provider network 200 via a network 260. Provider network 200 may implement respective instantiations of the same (or different) services, a database services 210, proxy service 240, a storage service 220 and/or one or more other virtual computing service 230 across multiple provider network regions, in some embodiments. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 22 and described below. In various embodiments, the functionality of a given service system component (e.g., a component of the database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client configurable to submit network-based services requests to provider network region 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style web services architecture, a document- or message-based network-based services architecture, or another suitable network-based services architecture. Although not illustrated, some clients of provider network 200 services may be implemented within provider network 200 (e.g., a client application of database service 210 implemented on one of other virtual computing service(s) 230), in some embodiments. Therefore, various examples of the interactions discussed with regard to clients 250 may be implemented for internal clients as well, in some embodiments.

In some embodiments, a client 250 (e.g., a database service client) may be may provide access to network-based storage of database tables to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet. For example, clients 250 may be provisioned within the same enterprise as a database service system (e.g., a system that implements database service 210 and/or storage service 220). In such a case, clients 250 may communicate with provider network 200 entirely through a private network 260 (e.g., a LAN or WAN that may use Internet-based communication protocols but which is not publicly accessible).

Generally speaking, provider network 200 may implement one or more service endpoints may receive and process network-based services requests, such as requests to access a database (e.g., queries, inserts, updates, etc.) and/or manage a database (e.g., create a database, configure a database, etc.). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements database service 210, time synchronization service 240, storage service 220 and/or another service(s) 230 for processing. In other embodiments, provider network 200 may be configured as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

In addition to functioning as an addressable endpoint for clients' network-based services requests, in some embodiments, provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization, such as the target capacity determined for individual database engine head node instances, network bandwidth and/or storage utilization, rates and types of errors resulting from requests, characteristics of stored and databases (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of database service 210, storage service 220 and/or another service 230 (or the underlying systems that implement those services).

In some embodiments, provider network 200 may also implement user authentication and access control procedures. For example, for a given network-based services request to access a particular database table, provider network 200 ascertain whether the client 250 associated with the request is authorized to access the particular database table. Provider network 200 may determine such authorization by, for example, evaluating an identity, password or other credential against credentials associated with the particular database table, or evaluating the requested access to the particular database table against an access control list for the particular database table. For example, if a client 250 does not have sufficient credentials to access the particular database table, provider network 200 may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, services, like database service 210 or storage service 220 may be internal to a computing system or an enterprise system that provides database services to clients 250, and may not be exposed to external clients (e.g., users or client applications). In such embodiments, the internal "client" (e.g., database service 210) may access storage service 220 over a local or private network (e.g., through an API directly between the systems that implement these services). In such embodiments, the use of storage service 220 in storing database tables on behalf of clients 250 may be transparent to those clients. In other embodiments, storage service 220 may be exposed to clients 250 through provider network region to provide storage of database tables or other information for applications other than those that rely on database service 210 for database management. In such embodiments, clients of the storage service 220 may access storage service 220 via network 260 (e.g., over the Internet). In some embodiments, a virtual computing service 230 may receive or use data from storage service 220 (e.g., through an API directly between the virtual computing service 230 and storage service 220) to store objects used in performing computing services 230 on behalf of a client 250. In some cases, the accounting and/or credentialing services of provider network region may be unnecessary for internal clients such as administrative clients or between service components within the same enterprise.

Note that in various embodiments, different storage policies may be implemented by database service 210 and/or storage service 220. Examples of such storage policies may include a durability policy (e.g., a policy indicating the number of instances of a database table (or data page thereof, such as a quorum-based policy) that will be stored and the number of different nodes on which they will be stored) and/or a load balancing policy (which may distribute database tables, or data pages thereof, across different nodes, volumes and/or disks in an attempt to equalize request traffic). In addition, different storage policies may be applied to different types of stored items by various one of the services. For example, in some embodiments, storage service 220 may implement a higher durability for redo log records than for data pages.

Figure 3:
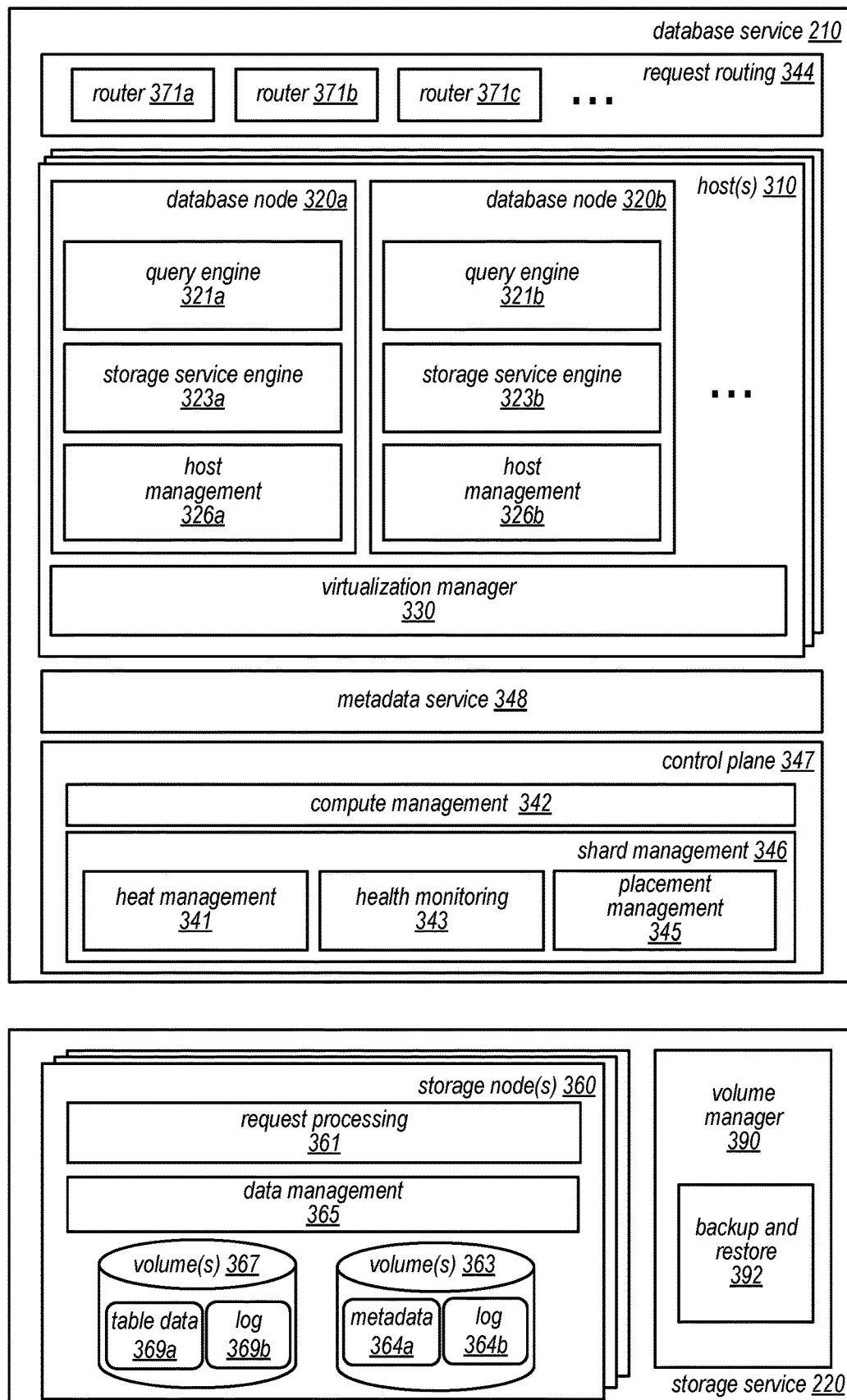
FIG. 3 is a block diagram illustrating various components of a database service and storage service that supports both a client-managed table and system-managed table in a common database, according to some embodiments.

FIG. 3 is a block diagram illustrating various components of a database service and storage service that supports both a client-managed table and system-managed table in a common database, according to some embodiments. Database service 210 may implement control plane 347 which may manage the creation, provisioning, deletion, or other features of managing a database hosted in database service 210. For example, control plane 347 may monitor the performance of host(s) 310 (e.g., a computing system or device like computing system 3000 discussed below with regard to FIG. 22) via compute management 342 and shard management 346 (e.g., via heat management 341) for high workloads (e.g., heat) and move or shard assignments away from some hosts to avoid overburdening host(s) 310. Control plane 347 may handle various management requests, such as request to create databases, manage databases (e.g., by configuring or modifying performance, such as by enabling a "limitless table feature" or other automated management feature in response to a request which may cause in-place resource scaling to be enabled for that system-managed table. Control plane 347 may implement shard management 346 for system-managed tables to handle heat management 341, health monitoring 343 and placement management 345, as well as overall compute management 342 (e.g., also for client-managed tables).

Database service 210 may implement one or more different types of database systems with respective types of query engines for accessing database data as part of the database. In at least some embodiments, database service 210 may be a relational database service that hosts relational databases on behalf of clients. For example, database service 210 may implement various types of connection-based (e.g., having established a network connection between a database client and a router for an endpoint of a database which may route requests to various database nodes which may, for instance, facilitate the performance of various operations that continue over multiple communications between the database client and a connected router of a pool of routers 371*a*, 371*b*, 371*c*, and so on, of request routing 344 (or directly to a database node in some scenarios as discussed below with regard to FIG. 5).

Figure 8:
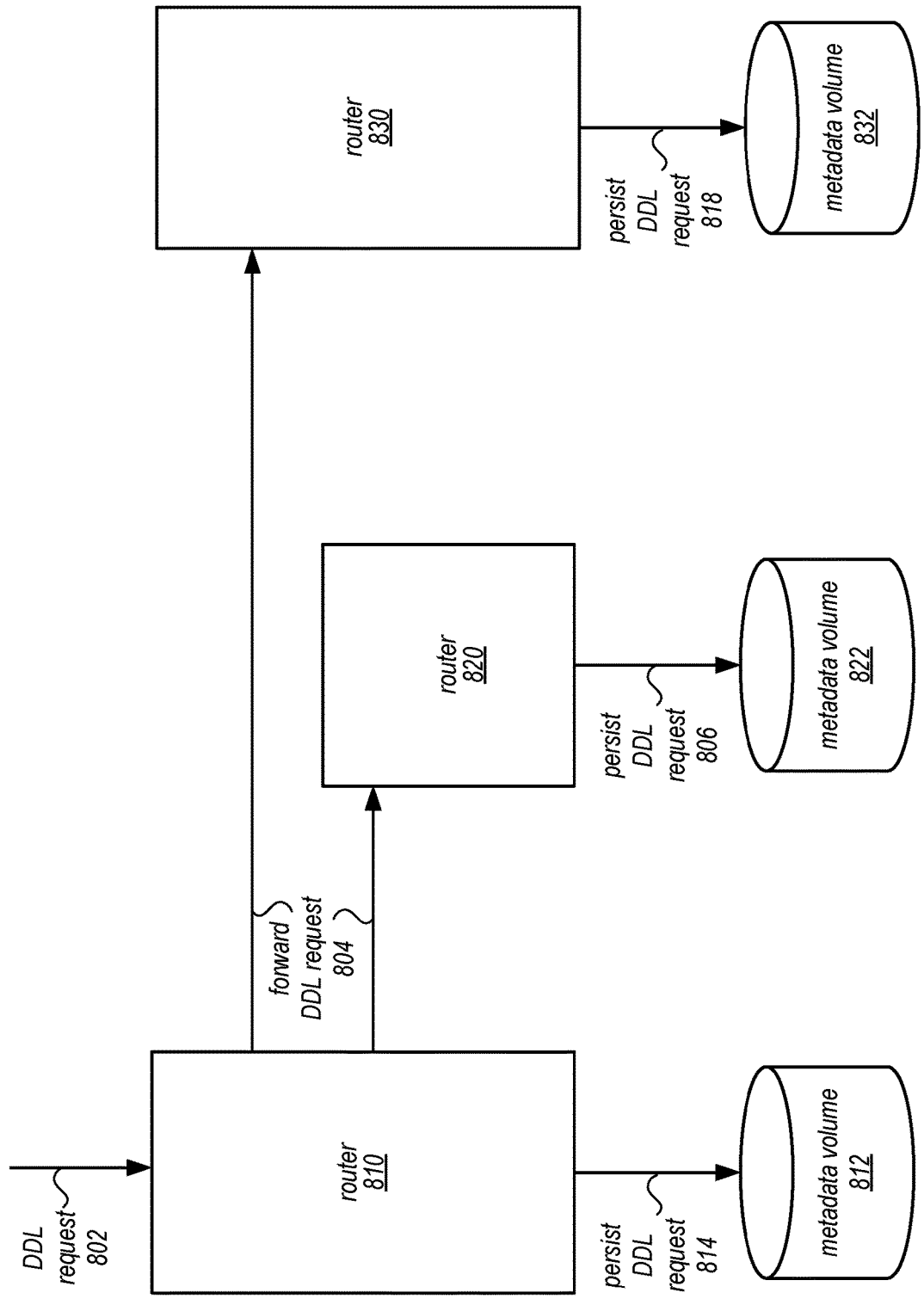
FIG. 8 is a logical block diagram illustrating the forwarding of DDL requests to other routers, according to some embodiments.

In some embodiments, pool of routers 371 may be assigned to a particular database, such that the combination of routers 371 and database nodes 320 may be considered a cluster. For example, when a client opens a client connection, the DNS (or NLB) will re-direct the physical socket connection to one of the routers 371. Since the routers 371 serve as the front end for all traffic, they may be implemented to be highly available. The routers may be similar to (e.g., run same engine binaries) to database nodes 310 and may, in some embodiments, host database tables (not illustrated). Each router 371 may be attached to one or more data stores to store metadata (and in some embodiments table data) and temporary tables or other temporary data that may need to be persisted locally. In some embodiments, a router 371 may be designated a router leader (e.g., one of a group of routers as depicted in FIG. 8). The router leader will be the primary owner of system-managed table metadata. The router leader may also serve as the coordinator when necessary for operations that might require serialization. In some embodiments, routers 371 may be distributed across fault tolerance or other availability zones and may perform router failover (or router addition) in order to maintain high availability for a database to which the pool of routers are assigned.

Figure 5:
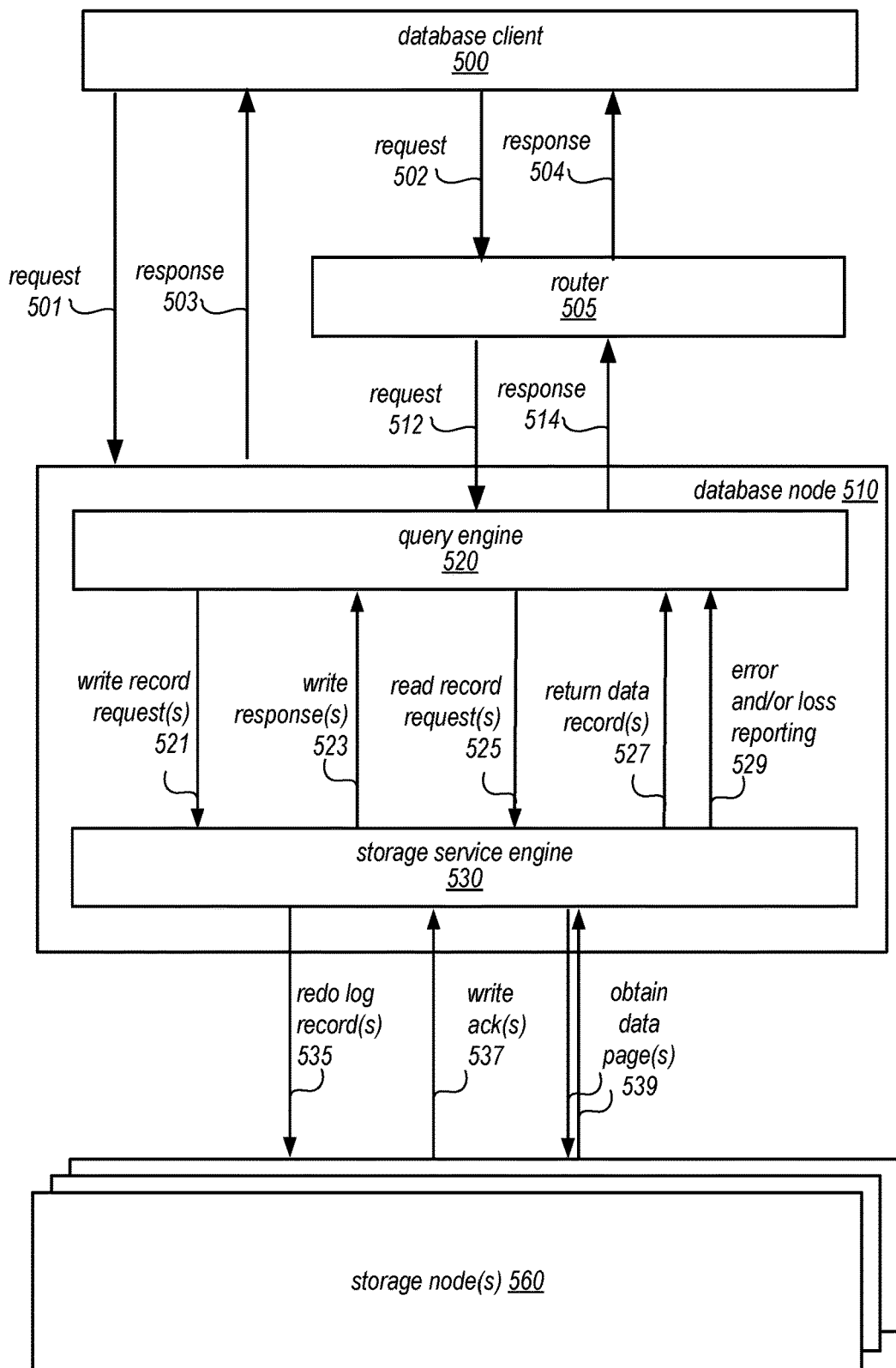
FIG. 5 is a block diagram illustrating various interactions to handle database client requests, according to some embodiments.
Figure 7:
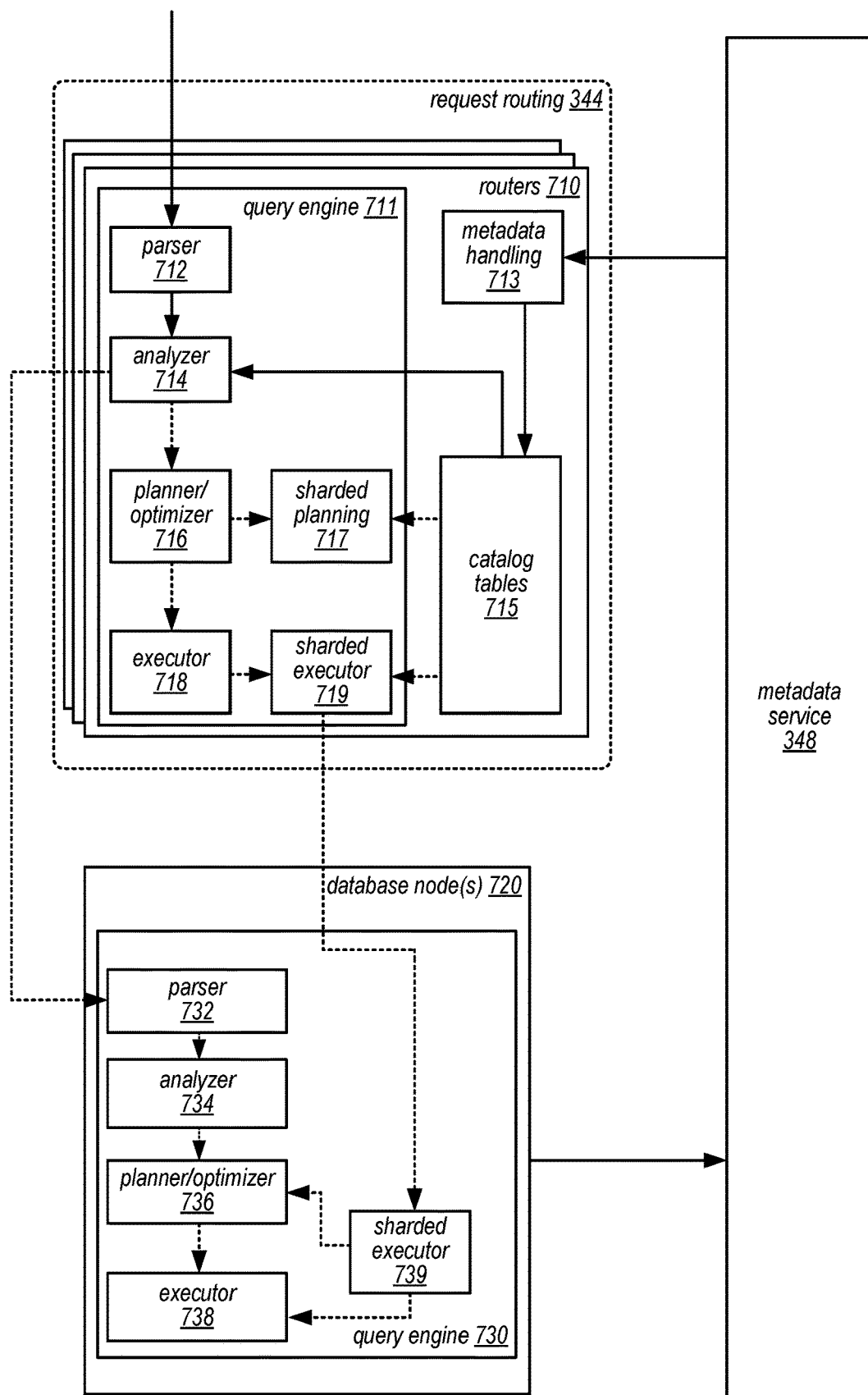
FIG. 7 is a logical block diagram illustrating a router that performs intelligent query routing across client-managed and system-managed tables, according to some embodiments.

In some embodiments, routers 371 may implement respective connection managers (not illustrated). As router nodes may mostly pull the data from database nodes for shards of a system-managed table (though not always as illustrated in some of the example distributed transaction techniques discussed below), in some embodiments, there may be a DB connection pool from every router 371 to every database node (e.g., for a database). However, reusing connections from one query engine (at a router as depicted in FIG. 7) to another (e.g., to a query engine implemented on a database node, also depicted in FIG. 7) cannot usually be done between users. In such scenarios, the connection manager may be responsible for cleaning up a database connection (with a client application as depicted in FIG. 5) after database session is closed (e.g., performing operations to clear data such as session configuration, user/role info, etc.) and starting processes, instances, or other components (e.g., pgBouncer instances for Postgres databases) for cases when new database nodes 320 and routers 371 nodes are added to a database with system-managed tables for a user as part of scale-out of database nodes or routers or recovery/replacement of existing database nodes or routers. When a new client application database connection to a router 371 needs to contact other nodes (e.g., router or a database node) it does so through foreign data wrapper (FDW) managed foreign server, which may be modified to contact a local connection manager for getting an available database connection at which moment the session context may be set based on an original database connection to a router. This may include session configuration (e.g., selective) and user/role info. With that, request routing 344 may ensure that access to remote objects respects privileges and as database nodes are computation nodes as well configuration is set (as it may not be common for FDW established connections which set just a user based on user mapping configured for a foreign server).

Database service 210 may implement a fleet of host(s) 310 which may provide, in various embodiments, a multi-tenant configuration so that different database nodes, such as database node 320*a* and 320*b*, can be hosted on the same host 310, but provide access to different databases on behalf of different clients over different connections. While hosts(s) 310 may be multi-tenant, each database node 320 may be provisioned on host(s) 310 in order to implement in-place scaling (e.g., by overprovisioning resources initially and then scaling-based on workload to right-size the capacity that it is recorded as utilized for an account that owns or is associated with the database that is accessed by the database engine head node 320).

In various embodiments, host(s) 310 may implement a virtualization technology, such as virtual machine based virtualization, wherein database engine head node instances 320 may be different respective virtual machines, micro virtual machines (microVMs) which may offer a reduced or light-weight virtual machine implementation that retains use of individual kernels within a microVM, or containers which offer virtualization of an operating system using a shared kernel. Host(s) 310 may implement virtualization manager 330, which may support hosting one or multiple separate database engine head node instances 320 as different respective VMs, microVMs, or containers. Virtualization manager 330 may support increasing or decreasing resources made available to host(s) 310 to use for other tasks (including other database engine head node(s) 320) that were allocated to a database engine head node 320 upon creation at host(s) 310, as discussed below with regard to FIG. 9.

Database node(s) 320 may support various features for accessing a database, such as query engine(s) 321*a* and 321*b*, and storage service engine(s) 323*a* and 323*b* discussed in detail below with regard to FIGS. 5-8. Database nodes 320 may implement agents, interfaces, or other controls according to the respective type of virtualization used to collect and facilitate communication of utilization metrics for in-place scaling, among other supported aspects of virtualization, such as host management 326*a* and 326*b*. For example, host management 326 may implement resource utilization measurement, which may capture and/or access utilization information for host(s) 310 to determine which portion of utilization can be attributed to a specific database engine head node 320.

In some embodiments, database data for a database of database service 210 may be stored in a separate storage service 220. In some embodiments, storage service 220 may be implemented as to store database data as virtual disk or other persistent storage drives. In other embodiments, embodiments, storage service 220 may store data for databases using log-structured storage. Storage service 220 may implement volume manager 390, which may implement various features including backup and restore 392.

For example, in some embodiments, data may be organized in various logical volumes, segments, and pages for storage on one or more storage nodes 360 of storage service 220. For example, in some embodiments, each database may be represented by a logical volume, such as logical volumes 367 and 363 (which may include both table data 369a and corresponding log(s) 369(b) (e.g., redo logs). Table data 369a may be an entire table for a client-managed table or a shard of a system-managed table, as discussed in detail below. In some embodiments, volume(s) 363 may store metadata 364a for a database and a respective change log 364b. Each logical volume may be segmented over a collection of storage nodes 360. Each segment, which may live on a particular one of the storage nodes, may contain a set of contiguous block addresses, in some embodiments. In some embodiments, each segment may store a collection of one or more data pages and a change log (also referred to as a redo log) (e.g., a log of redo log records) for each data page that it stores. Storage nodes 360 may receive redo log records and to coalesce them to create new versions of the corresponding data pages and/or additional or replacement log records (e.g., lazily and/or in response to a request for a data page or a database crash). In some embodiments, data pages and/or change logs may be mirrored across multiple storage nodes, according to a variable configuration (which may be specified by the client on whose behalf the databases is being maintained in the database system). For example, in different embodiments, one, two, or three copies of the data or change logs may be stored in each of one, two, or three different availability zones or regions, according to a default configuration, an application-specific durability preference, or a client-specified durability preference.

In some embodiments, a volume may be a logical concept representing a highly durable unit of storage that a user/client/application of the storage system understands. A volume may be a distributed store that appears to the user/client/application as a single consistent ordered log of write operations to various user pages of a database, in some embodiments. Each write operation may be encoded in a log record (e.g., a redo log record), which may represent a logical, ordered mutation to the contents of a single user page within the volume, in some embodiments. Each log record may include a unique identifier (e.g., a Logical Sequence Number (LSN)), in some embodiments. Each log record may be persisted to one or more synchronous segments in the distributed store that form a Protection Group (PG), to provide high durability and availability for the log record, in some embodiments. A volume may provide an LSN-type read/write interface for a variable-size contiguous range of bytes, in some embodiments.

In some embodiments, a volume may consist of multiple extents, each made durable through a protection group. In such embodiments, a volume may represent a unit of storage composed of a mutable contiguous sequence of volume extents. Reads and writes that are directed to a volume may be mapped into corresponding reads and writes to the constituent volume extents. In some embodiments, the size of a volume may be changed by adding or removing volume extents from the end of the volume.

In some embodiments, a segment may be a limited-durability unit of storage assigned to a single storage node. A segment may provide a limited best-effort durability (e.g., a persistent, but non-redundant single point of failure that is a storage node) for a specific fixed-size byte range of data, in some embodiments. This data may in some cases be a mirror of user-addressable data, or it may be other data, such as volume metadata or erasure coded bits, in various embodiments. A given segment may live on exactly one storage node, in some embodiments. Within a storage node, multiple segments may live on each storage device (e.g., an SSD), and each segment may be restricted to one SSD (e.g., a segment may not span across multiple SSDs), in some embodiments. In some embodiments, a segment may not be required to occupy a contiguous region on an SSD; rather there may be an allocation map in each SSD describing the areas that are owned by each of the segments. As noted above, a protection group may consist of multiple segments spread across multiple storage nodes, in some embodiments. In some embodiments, a segment may provide an LSN-type read/write interface for a fixed-size contiguous range of bytes (where the size is defined at creation). In some embodiments, each segment may be identified by a segment UUID (e.g., a universally unique identifier of the segment).

In some embodiments, a page may be a block of storage, generally of fixed size. In some embodiments, each page may be a block of storage (e.g., of virtual memory, disk, or other physical memory) of a size defined by the operating system, and may also be referred to herein by the term "data block". A page may be a set of contiguous sectors, in some embodiments. A page may serve as the unit of allocation in storage devices, as well as the unit in log pages for which there is a header and metadata, in some embodiments. In some embodiments, the term "page" or "storage page" may be a similar block of a size defined by the database configuration, which may typically a multiple of 2, such as 4096, 8192, 16384, or 32768 bytes.

In some embodiments, storage nodes 360 of storage service 220 may perform some database system responsibilities, such as the updating of data pages for a database, and in some instances perform some query processing on data. As illustrated in FIG. 3, storage node(s) 360 may implement data page request processing 361, and data management 365 to implement various ones of these features with regard to the data pages 367 and page log 369 of redo log records among other database data in a database volume stored in log-structured storage service. For example, data management 365 may perform at least a portion of any or all of the following operations: replication (locally, e.g., within the storage node), coalescing of redo logs to generate data pages, snapshots (e.g., creating, restoration, deletion, etc.), clone volume creation, log management (e.g., manipulating log records), crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments. Data page request processing 361 may handle requests to return data pages of records from a database volume, and may perform operations to coalesce redo log records or otherwise generate a data pages to be returned responsive to a request.

In at least some embodiments, storage nodes 360 may provide multi-tenant storage so that data stored in part or all of one storage device may be stored for a different database, database user, account, or entity than data stored on the same storage device (or other storage devices) attached to the same storage node. Various access controls and security mechanisms may be implemented, in some embodiments, to ensure that data is not accessed at a storage node except for authorized requests (e.g., for users authorized to access the database, owners of the database, etc.).

Figure 4:
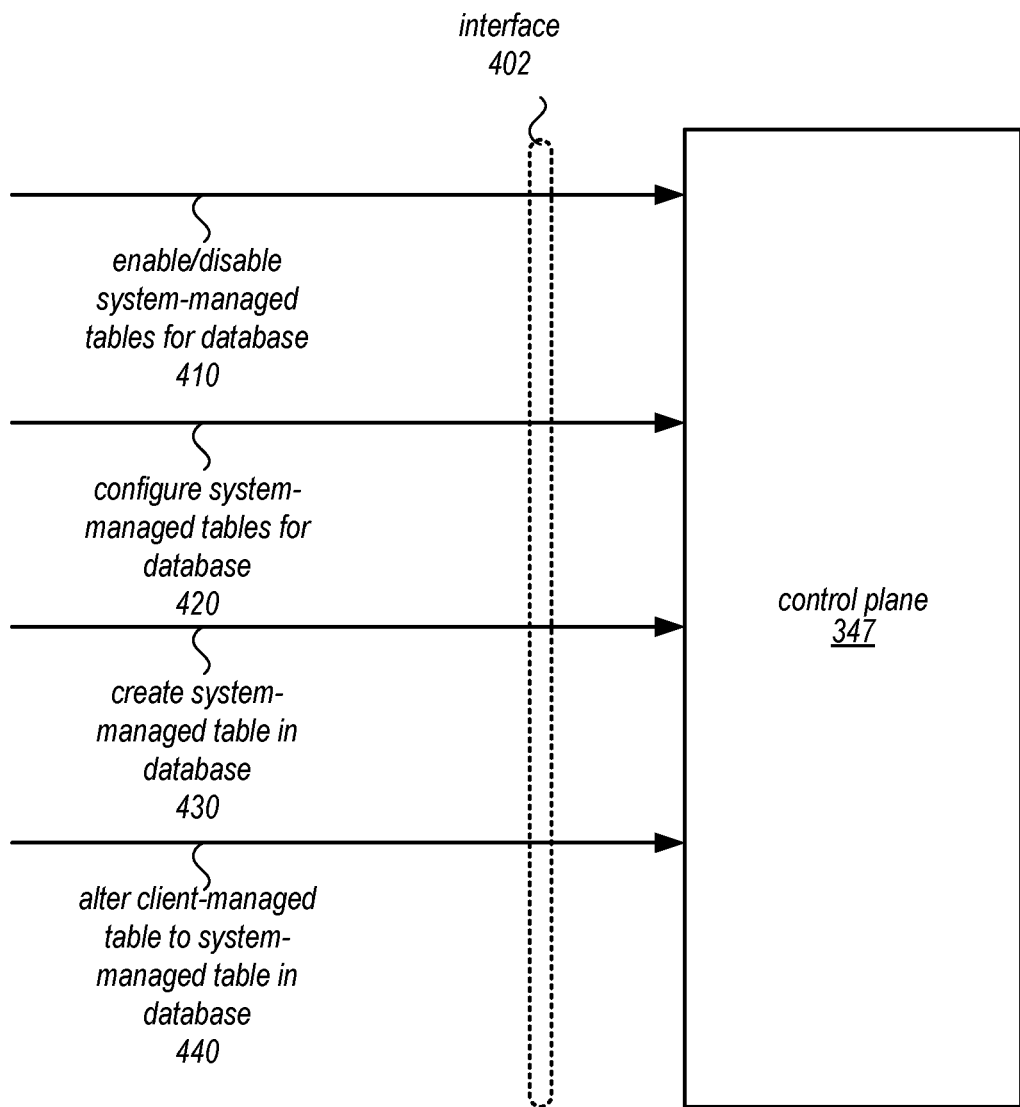
FIG. 4 is a block diagram illustrating various interactions to handle database client requests, according to some embodiments.

FIG. 4 illustrates interactions with a control plane of a database service for managing system-managed tables, according to some embodiments. Interface 402 may be a command line, programmatic (e.g., API), or graphical user interface for control plane 347. As indicated at 410, a request to enable or disable system-managed tables for a database may be received, in some embodiments. For example, the database may be identified (e.g., by identifier such as a number or resource number) along with the parameter set to enable or disable system-managed tables. In some embodiments, various system-management parameters, such as scaling limits for computing resources, including cost-based, resource-based, or other limitations, for instance as minimum and or maximum boundaries for scaling (or scaling within a period of time). As indicated at 420, these system-managed table parameters can be separately configured to add, remove, or change the parameters. In some embodiments, enabling system-managed tables may include parameters to configure the availability of the table across one (or more) availability zones.

Enabling system-managed tables may cause the creation of (or transfer of) a network endpoint (e.g., a network address) that is specific to the database to route requests to request routing 344 (which may assign or distribute the request to connect the database to different ones of routers 371 according to a load balancing scheme). In this way, connection requests to access the database (whether for a system-managed table or client-managed table) may be routed through request router 344 (e.g., instead of being routed directly to an existing database node already assigned to a current client-managed table of the database). These system-managed table parameters may be stored or updated in an administrative database and/or database metadata that is used to control database service 210 management of the database using various control plane features.

In some embodiments, control plane 347 may receive request to create a system-managed table in a database, as indicated at 430 or alter a client-managed table to a system managed table in the database, as indicated at 440. In some embodiments, these requests may be received at the database node for the database directly or at a router and thus may be received through the "data plane." These requests, however may then be forwarded or dispatched to control plane 347 to direct the operations to complete the requests.

Control plane 347 may perform the various operations to create or alter tables to system-managed tables. For example, aligned tables may be identified and stored across different shards, as discussed below with regard to FIGS. 10 and 20 according to an initial placement hierarchy that may be determined for the system-managed table(s) (e.g., a default or standard hierarchy may be initially used and then modified overtime according various heat or operations). Various migration techniques may be used to move the existing table data to the appropriate shard or store, when received, new data into a table (e.g., as part of insert requests or batch updates to add table data). Control plane 347 may initialize or update metadata to identify the new (or altered) system-managed table so that routers may correctly identify and route requests to the appropriate database nodes. Control plane 347 may also provision or assign database nodes to shards of the system-managed table.

FIG. 5 is a block diagram illustrating various interactions to handle database client requests, according to some embodiments. In the example database system implemented as part of database service 210, a database engine head node 510 may be implemented for each database and storage nodes 560 (which may or may not be visible to the clients of the database system and may be similar to storage nodes 360 discussed above with regard to FIG. 3). Clients of a database may access a database node 510 directly in some embodiments (as indicated at request and response 503 instead of through router 510, such as requests that are directed to client-managed tables) via network utilizing various database access protocols (e.g., Java Database Connectivity (JDBC) or Open Database Connectivity (ODBC)). However, storage nodes 560, which may be employed by the database service 210 to store data pages of one or more databases (and redo log records and/or other metadata associated therewith) on behalf of clients, and to perform other functions of the database system as described herein, may or may not be network-addressable and accessible to database clients directly, in different embodiments. For example, in some embodiments, storage nodes 560 may perform various storage, access, change logging, recovery, log record manipulation, and/or space management operations in a manner that is invisible to clients of a database node 510.

As previously noted, a database node 510 may implement query engine 520 and storage service engine 530, in some embodiments. Query engine 520 may receive requests, like request 512, which may include queries or other requests such as updates, deletions, etc., from a router 505 connected to a database client 500 which first received the request 502 from the database client 500. Implementing a router 505 between database client 500 and database node 510 may allow for database service 210 implement both client-managed tables and system-managed tables in the same database, as discussed in detail below. Query engine 520 then parses them, optimizes them, and develops a plan to carry out the associated database operation(s), as discussed in detail below with regard to FIG. 7.

Query engine 520 may return a response 514 to the request (e.g., results to a query) which router 505 may provide as response 504 to database client 500, which may include write acknowledgements, requested data (e.g., records or other results of a query), error messages, and or other responses, as appropriate. As illustrated in this example, database node 510 may also include a storage service engine 530 (or client-side driver), which may route read requests and/or redo log records to various storage nodes 560 within storage service 220, receive write acknowledgements from storage nodes 560, receive requested data pages from storage nodes 560, and/or return data pages, error messages, or other responses to query engine 520 (which may, in turn, return them to a database client).

In this example, query engine 520 or another database system management component implemented at database engine head node 510 (not illustrated) may manage a data page cache, in which data pages that were recently accessed may be temporarily held. Query engine 520 may be responsible for providing transactionality and consistency in the database of which database engine head node 510 is a component. For example, this component may be responsible for ensuring the Atomicity, Consistency, and Isolation properties of the database and the transactions that are directed that the database, as discussed in detail below with regard to FIGS. 13-15, and 18, such as determining a consistent view of the database applicable for a query, applying undo log records to generate prior versions of tuples of a database. Query engine 520 may manage an undo log to track the status of various transactions and roll back any locally cached results of transactions that do not commit.

For example, a request 512 that includes a request to write to a page may be parsed and optimized to generate one or more write record requests 521, which may be sent to storage service engine 530 for subsequent routing to storage service nodes 560. In this example, storage service engine 530 may generate one or more redo log records 535 corresponding to each write record request 521, and may send them to specific ones of the storage nodes 560 of storage service 220. Storage nodes 560 may return a corresponding write acknowledgement 537 for each redo log record 535 (or batch of redo log records) to database node 510 (specifically to storage service engine 530). Storage service engine 530 may pass these write acknowledgements to query engine 520 (as write responses 523), which may then send corresponding responses (e.g., write acknowledgements) to one or more clients as a response 514.

In another example, a request that is a query may cause data pages to be read and returned to query engine 520 for evaluation. For example, a query could cause one or more read record requests 525, which may be sent to storage service engine 530 for subsequent routing to storage nodes 560. In this example, storage service engine 530 may send these requests to specific ones of the storage nodes 560, and storage nodes 560 may return the requested data pages 539 to database node 510 (specifically to storage service engine 530). Storage service engine 530 may send the returned data pages to query engine 520 as return data records 527, and query engine 520 may then evaluate the content of the data pages in order to determine or generate a result of a query sent as a response 514.

In some embodiments, various error and/or data loss messages 541 may be sent from log-structured storage service 550 to database node 510 (specifically to storage service engine 530). These messages may be passed from storage service engine 530 to query engine 520 as error and/or loss reporting messages 529, and then to one or more clients as a response 514.

In some embodiments, the APIs 535-539 to access storage nodes 560 and the APIs 521-529 of storage service engine 530 may expose the functionality of storage service 220 to database node 510 as if database node 510 were a client of storage service 220. For example, database node 510 (through storage service engine 530) may write redo log records or request data pages through these APIs to perform (or facilitate the performance of) various operations of the database system implemented by the combination of database node 510 and storage nodes 560 (e.g., storage, access, change logging, recovery, and/or space management operations).

Note that in various embodiments, the API calls and responses between database node 510 and storage nodes 560 (e.g., APIs 521-529) and/or the API calls and responses between storage service engine 530 and query engine 520 (e.g., APIs 535-539) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C # and Perl to support integration with database node 510 and/or storage nodes 560.

Figure 6:
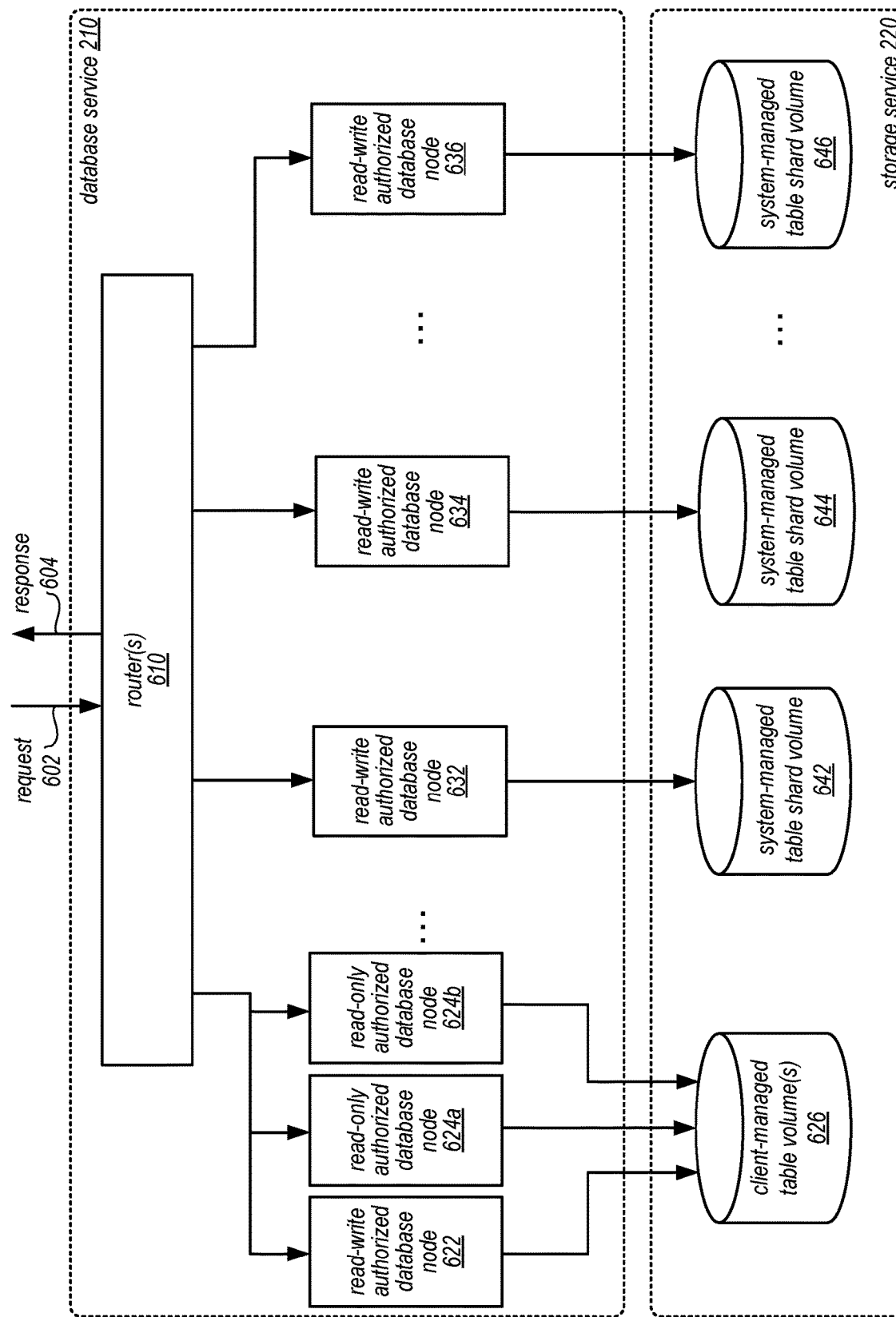
FIG. 6 is a logical block diagram illustrating interactions for a database that includes both a client-managed table and a system-managed table.

FIG. 6 is a logical block diagram illustrating interactions for a database that includes both a client-managed table and a system-managed table. Request 602 may be received at one of many routers 610 that are implemented as part of database service 210, as discussed above with regard to FIG. 3. A router 610 may accept the request and direct it to the appropriate database nodes using both the query planning location selection techniques and, if a transaction, commit protocol techniques, discussed below with regard to FIGS. 7, 13-15, and 17-18. A client-managed table may be stored in a client-managed table volume 626 which may be connected to assigned database nodes, such as read-write authorized database node 622. In some embodiments, read-only nodes 624a and 624b, can also be assigned to increase read capacity. As discussed above with regard to FIG. 5, database node 622 can request data pages, send redo log records, and otherwise interact with client-managed table volumes for portions of access requests targeted to client-managed tables.

For a system-managed table, multiple shards may be determined assigned to different read-write database nodes 632, 634, and 636 respectively for shards stored in volumes 642, 644, and 646. Although not illustrated, read-only nodes may also be assigned to shards in order to satisfy the workload requirements on system-managed tables. The number of assigned database nodes and shards for a system-managed table may change over time as additional compute or storage capacity is needed. These changes may be determined automatically by database service 210 (e.g., via heat management 342 as discussed below with regard to FIG. 9).

FIG. 7 is a logical block diagram illustrating a router that performs intelligent query routing across client-managed and system-managed tables, according to some embodiments. Routers 710 may implement a query engine 711. When an access request is received, query engine 711 may parse the request at parser 712 and analyze the request at analyzer 714 to determine which shards or client-managed tables should be accessed to perform the access request according to catalog tables 715, which may be synchronized using metadata service 348 to obtain up-to-date shard, database node, and other assignments for tables in the database. Then, according to the analysis 714 different planning location(s) and execution paths (illustrated by the dotted line paths) may result, as discussed below with regard to FIG. 17. For example, network I/O minimization may be used to select between different distributed execution plans for access requests, in some embodiments.

For example, for router-selected planning, planner/optimizer 716 may generate a query plan and pass the plan off to sharded planning 717, which may add features to aggregate results from multiple database nodes at shards (and also a client-managed table if included in a request with one or more shards). The sharded plan may then be passed to executor 718 which may provide instructions to sharded executor 719 to perform at database node(s) 720. Database nodes 720 may perform different requests according to different execution paths (e.g., receiving subsets of plans for further planning/optimization 736 and then execution through sharded executor 739, or straight to executor 738 via sharded executor 739). Alternatively, when a database node is involved in performing a request (e.g., at only one database node), then the request may be sent for parsing 732, analysis 734, planning/optimization 736, and optimization 738. Although not depicted results may be returned from the database node(s) 720 to router 710 to return to a client (as depicted in FIG. 5).

Figure 11:
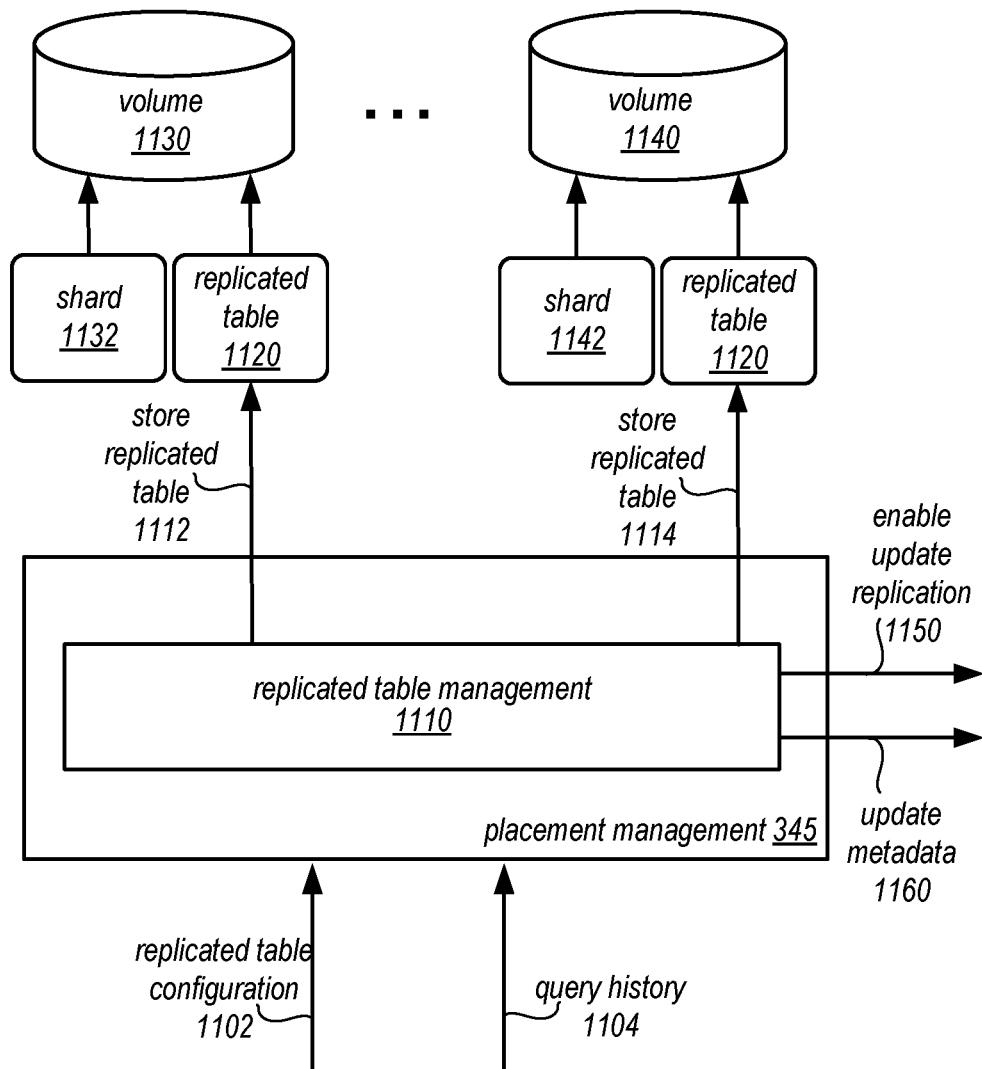
FIG. 11 is a logical block diagram of replicated table management for client-managed tables and system-managed tables of a database, according to some embodiments.

Updates that are caused to metadata (e.g., changes to database schemas by DDL requests or modifications to client-managed tables that are replicated, as discussed with regard to FIG. 11), may be reported through metadata service 348.

FIG. 8 is a logical block diagram illustrating the forwarding of DDL requests to other routers, according to some embodiments. In some embodiments, an access request may be a DDL request, a data definition language (DDL) request, that changes a schema of a table or database, as indicated at 802. Because such changes may alter the performance of different routers that may handle the request, the receiving router 810 may forward the request to other routers, such as router 820 and 830. In this way, each router may respectively persist their DDL change in their own metadata volume, as indicated at 814 to 812, 806 to 822, and 818 to 832 respectively.

In some embodiments, other metadata propagation techniques may be used. For example, a synchronous mode technique where all metadata changes are committed to all data/shard nodes and router nodes synchronously at same time may be implemented ensuring all nodes are up-to-date. To do this, distributed transactions to perform DDLs propagation to other nodes, like those discussed below with regard to FIG. 13, may be performed. In another example, an asynchronous technique may be performed where DDLs are applied to local Router node immediately, but for other nodes DDL info is stored in a DDL Log component (keeping lists of DDL Logs for every node in system-managed table database node) and where every router/database shard node monitors its own DDL list in the DDL Log component and applies everything that was not applied so far. This also simplifies process of recovery for a router node that was down as part of recovery process. This mode may be used primarily for long running DDLs (such as CREATE INDEX, VACUUM and similar) so as not to disrupt query processing performance.

Figure 9:
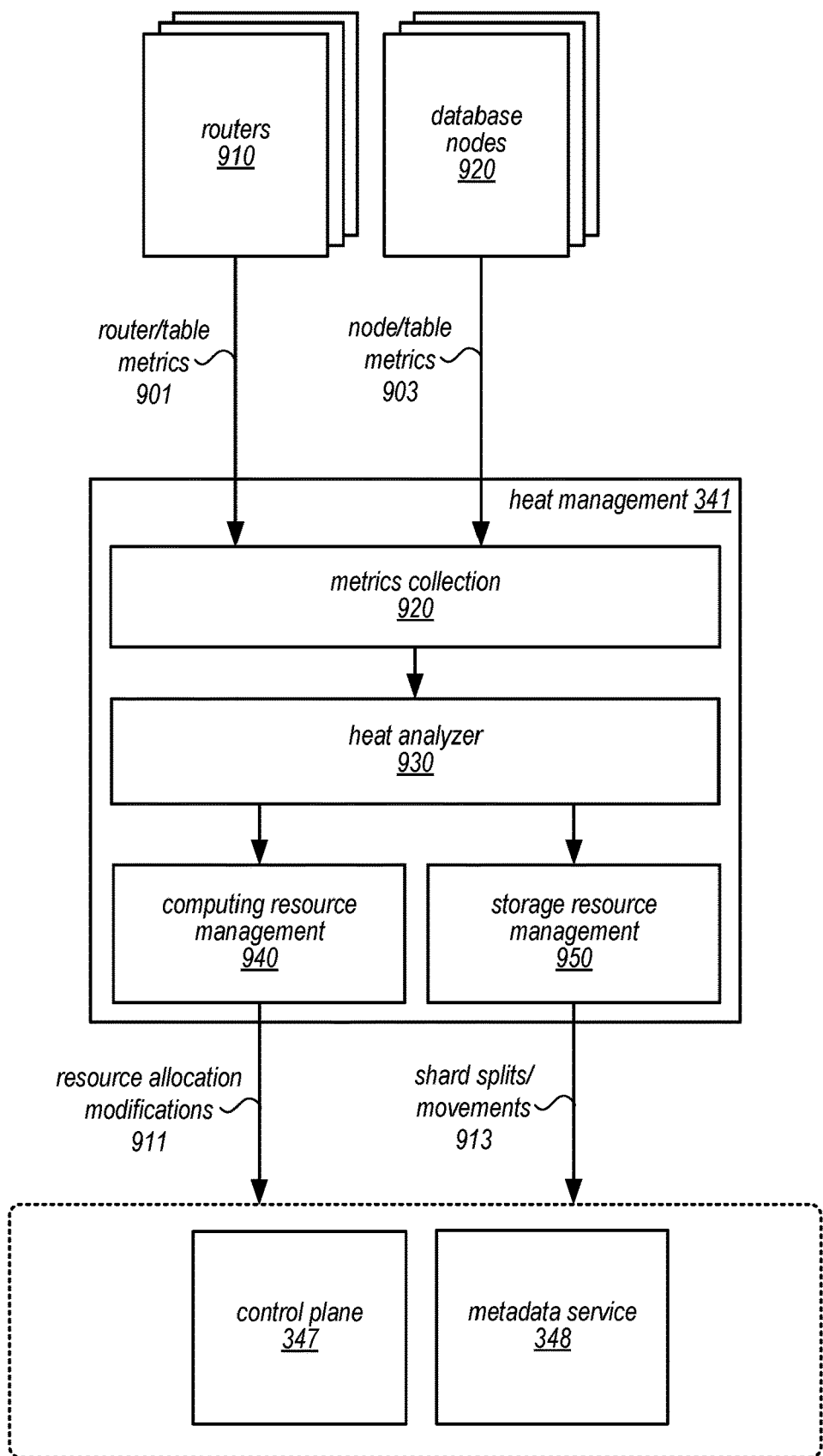
FIG. 9 is a logical block diagram illustrating heat management for system-managed tables sharded according to a placement hierarchy, in some embodiments.

FIG. 9 is a logical block diagram illustrating heat management for system-managed tables sharded according to a placement hierarchy, in some embodiments. Heat management 341 may implement metrics collection 920. Metrics collection 920 may interact with many different components to make optimal scaling decisions for system-managed tables. For example, routers 910 may be one or more routers that direct access requests to the database and may provide router-level and table-level metrics 901. For example, router-level metrics may include the computational workloads (e.g., CPU, memory, network, frequency, execution time, throughput, number of connections, etc.) for various access requests (e.g., queries) and the table-specific metrics for those requests (e.g., latency waiting on certain tables/table shards). Likewise database nodes 920 may also provide node and table metrics 903. Node/table metrics 903 may include the computational workloads (e.g., CPU, memory, network, frequency, execution time, etc.) for various access requests performed by the database nodes 920 (e.g., queries) and the table-specific metrics for those requests (e.g., latency waiting on certain tables/table shards, number and/or frequency of certain types of requests, such as select, update, delete, or insert operations per table). In some embodiments, similar host-level metrics (e.g., which may have multiple database nodes as discussed above with regard to FIG. 3) may be implemented.

Heat analyzer 930 may receive the various metrics and perform different heat analysis techniques to determine which, if any, responsive actions should be taken to scale storage or compute for a system-managed table (or group of aligned system-managed tables). For example, heat analyzer may apply various compute scaling techniques to determine if adjustments should be made to computing resources allocated to a shard or multiple shards of a system-managed table. In some scenarios, these compute scaling actions may be on-node actions that may be performed by virtualization management of a host system, as discussed above with regard to FIG. 3, increasing/decreasing memory, processor allocation, or other resource allocations to a database node. In some scenarios, these compute scaling actions may include increasing or decreasing the number of database nodes for a system-managed table. In some embodiments, the decision to make scaling actions for compute may be based on compute units which may be a combination of various computing resource units that can be used to determine actual, predicted and allocated computing resources for a shard or system-managed table(s) overall. In this way, techniques to scale up or down the compute resources based on these compute units (e.g., by achieving a minimum or maximum number of compute units per database node) may be performed by heat analyzer 930. In some embodiments, system-managed table configuration information may be received in a request, as discussed above with regard to FIG. 4, and may provide minimum or maximum limits on various scaling actions by heat analyzer. Note that "heat" may be the workload placed on computing resources and thus a heat analyzer may consider the workload amounts to ensure that computing resources do not become overburdened, and thus too "hot."

Heat analyzer 930 may also apply techniques to detect scenarios when additional storage capacity may be needed (e.g., to add new storage volumes, and thus new shards). For example, when storage utilization approaches a certain threshold, further shard(s) may be created.

Heat analyzer 930 may interact with computing resource management 940 and storage resource management 950 in order to perform various responsive actions, such as resource allocation modifications 911 and shard splits or movements 913 respectively using operations supported by control plane 347. Updates to metadata service 348 may also be reported so that these changes may be propagated to routers performing access requests, such as updated shard assignments to database nodes or new shards or other effects of responsive actions.

Figure 10:
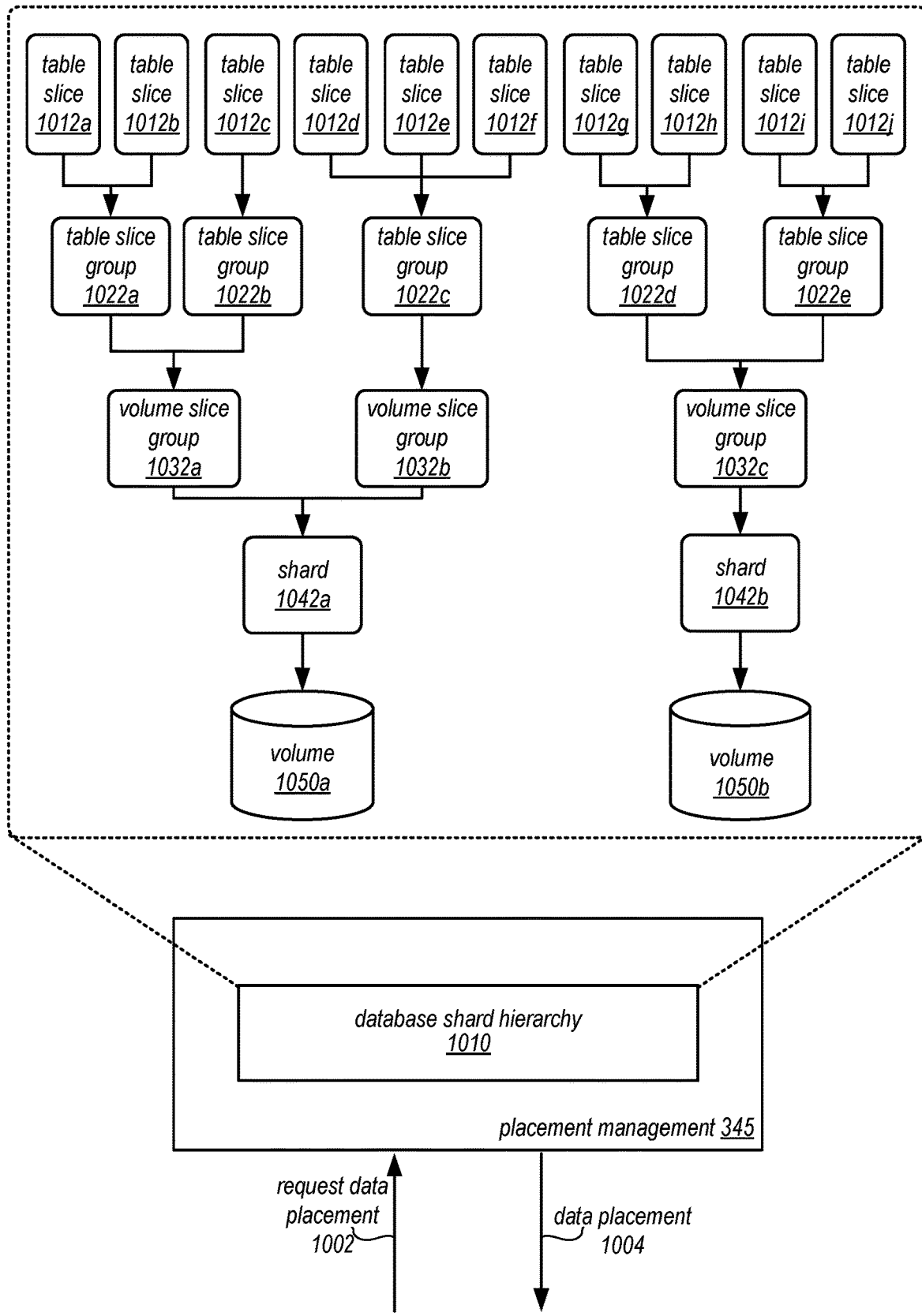
FIG. 10 is a logical block diagram illustrating resource placement according to a placement hierarchy for system-managed tables in a database, according to some embodiments.

FIG. 10 is a logical block diagram illustrating resource placement according to a placement hierarchy for system-managed tables in a database, according to some embodiments. Placement management 345 may handle requests to place data, such as requests to determine where to place a new database shard or a new system-managed table that is to be aligned with other system-managed tables. Thus placement requests 1002 and responses with a data placement 1004 may be informed by database shard hierarchy 1010 which may be maintained, evaluated and/or updated by placement management 345, in some embodiments.

Shard hierarchy 1010 may include multiple levels. Different embodiments may have different levels (e.g., with volume slice groups or no volume slice groups). Although one shard is depicted as being mapped to a volume, in other embodiments multiple shards may be mapped to a volume. Table slices may be a group of rows or records from a same table. Which rows of the table may be in a table slice may be determined according to a shard key. They shard key may be mapped to a range of values (or hash values as discussed below), which may be used to determine which table slice includes a given row. Tables may be aligned at the table slice group level. Aligned tables may have the same shard key values, even if other values in the records from the different tables are different or have different columns/schema other than the shard key.

For example, as illustrated in FIG. 10, table slice 1012a are records/rows from one table with a shard key that is within a same shard key range as the records from a different table that are in table slice 1012b. Thus these different tables are aligned at the table slice level in a table slice group, like table slice group 1022a. In some embodiments, each table slice group may be given a unique id. The primary intent of this grouping may be to improve performance so that transactions and most queries are local to a table slice group and by placing a table slice group within a shard improves performance by avoiding two-phase commit protocol that may be necessary for distributed transactions. In another way, the table slice group may be a grouping of table slices that have affinity. The grouping of table slices within a table slice group can be accomplished in different ways. A client-specified approach may allow requests, using sql syntax, to specify rules or specific table slices that belong to a table slice group. For example, with key partitioning, customers can use SQL syntax to align tables. All aligned tables using the same shard key(s) may be assigned a table slice group. Another way may be through automatic determination performed by placement management 345. For instance, table slices can be dynamically grouped into a table slice group when predominant number of transactions show affinity within a set of table slices. This may involve data movement after an initial sharding of a system-managed table.

Not all table slice groups, like table slice group 1022b may have data from more than one table (e.g., table slice 1012c representing records from one table). Different arrangements of the various table slices, 1012a, 1012b, 1012c, 1012d, 1012e, 1012f, 1012g. 1012h, 1012i, and 1012j may be grouped according to their common shard key values in table slice groups 1022a, 1022b, 1022c, 1022d, and 1022e. Likewise, these table slice groups may be grouped as volume slice groups, such as volume slice groups 1032a, 1032b, and 1032c, which may then be mapped to a shard, such as shards 1042a and 1042b. In some embodiments, the table slice group id may be hashed to a volume slice using an appropriate hashing function. This will allow a uniform distribution of table slice groups across the volume slices. The number of volume slices may be fixed, in some embodiments, to allow a reasonably fast hashing function.

A shard may represent a partition of one or multiple tables that are collocated in a respective storage volume, such as storage volumes 1050a and 1050b. As the different levels of the shard placement hierarchy 1010 offer different granularities of co-location, changes to the hierarchy may facilitate various different reorganizations, redistributions, additions, or combinations of data to support different scaling actions to handle different workloads (e.g., as shards may map to different database nodes). In some embodiments, shards may also correspond to specific storage location requirements, such as requirements that a shard be stored and available in specific geographic regions (e.g., provider network regions) but not be stored in other regions (e.g., for regulatory compliance). These geographic regions for replication (or exclusion from replication) may be specified as part of a table configuration or other request received at a control plane (or other component) of database service 210 for system-managed table(s). The configuration may be recorded or stored as part of metadata for the database.

Placement management 345 may utilize a mapping algorithm to initialize and add to a database shard hierarchy 1010. For example, in some embodiments, The mapping algorithm from a table slice group to a volume slice is independent of the mapping algorithm from a volume slice to a storage volume. Moreover the concept of volume slice allows the database service 210 to extend the architecture in the future to mount many volumes in one shard. In that case, each volume slice corresponds to one storage volume. Heat can be managed by un-mounting the volume slice from one shard and re-mounting it in another shard. In some embodiments, shards can be removed by un-mounting all the volume slices from one shard and re-mounting them in other shards. Volume slices may be migrated from one storage volume to another storage volume to balance load. In some embodiments, the volume slices may be moved to another shard using a clone operation to manage heat.

The mapping algorithm for a placement hierarchy may start with m volume slices and n nodes (m>>n). (e.g., m can be as high as 2 billion (possible range of hash values) and as low as the maximum number of nodes to support). Complexity of this problem can now be broken down into following sub-problems 1) Map a table slice group to a volume slice 2) Place a volume slice on a compute node 3) Efficiently move volume slices to other nodes for heat management. Mapping a table slice group to a volume slice: Each table slice group will be associated with a unique table slice group id. A good hash function will be used to map the table slice group id to a volume slice. Placing a volume slice on a compute node: "N random choices" placement algorithm can be used. The algorithms works as follows: 1/Construct an eligible list of shards based on temperature. 2/Randomly pick two shards from this list. 3/Pick the shard with the lowest temperature between the two for placement.

As noted above, the hierarchy 1010 may allow for efficiently moving volume slices to other nodes for heat management: There are a few occasions to move more volume slices, such as addition of new nodes by heat manager and removal of nodes by heat manager. When a table is partitioned, each table slice of the table may be physical and represented by <table>_<table slice id>. The table slice id is unique for each table. For example the table slices for a table named "product" will be represented by "product_1", "product_2" etc. A catalog table will provide the mapping from the table slice to its shard, in some embodiments. This mapping will be programmed in a router catalog table. The router will use the router catalog table to build the query plan that will then be dispatched to the appropriate shards Placement management 345 may further optimize performance of system-managed tables by recognizing and/or enabling replicated tables across one or more shards of the system-managed table in order to co-locate data to increase the likelihood of single shard queries instead of distributed query interaction. FIG. 11 is a logical block diagram of replicated table management for client-managed tables and system-managed tables of a database, according to some embodiments.

Replicated table management 1110 may identify client-managed tables of database for replication across shards according to the various techniques discussed in detail below with regard to FIG. 19. For example, a request to replicate a table may be specified as part of replicated table configuration 1102. This request may identify a current client-managed table (or one to be created) that should also be replicated across different shards of a system-managed table. Query history 1104 may be evaluated, in some embodiments, to automatically identify those client-managed table(s) that should be co-located with system-managed tables.

Once identified, replicated table management 1110 may store complete copies of the identified client-managed table in volumes of shards. For instance, operations to store the replicated table, as indicated at 1112 and 1114 may be performed. the resulting replicated table 1120 may then be stored in volumes 1130 for shard 1132 and 1140 for shard 1142 respectively. Replicated table management 1110 may also enable update replication 1150 (which may utilize various physical or logical replication techniques for updates performed by the database node assigned to the client-managed table). Replicated table management 1110 may also update metadata to reflect the addition of the replicated table 1120 to be co-located with shards 1132 and 1142, for example by sending a request to metadata service 348.

Figure 12:
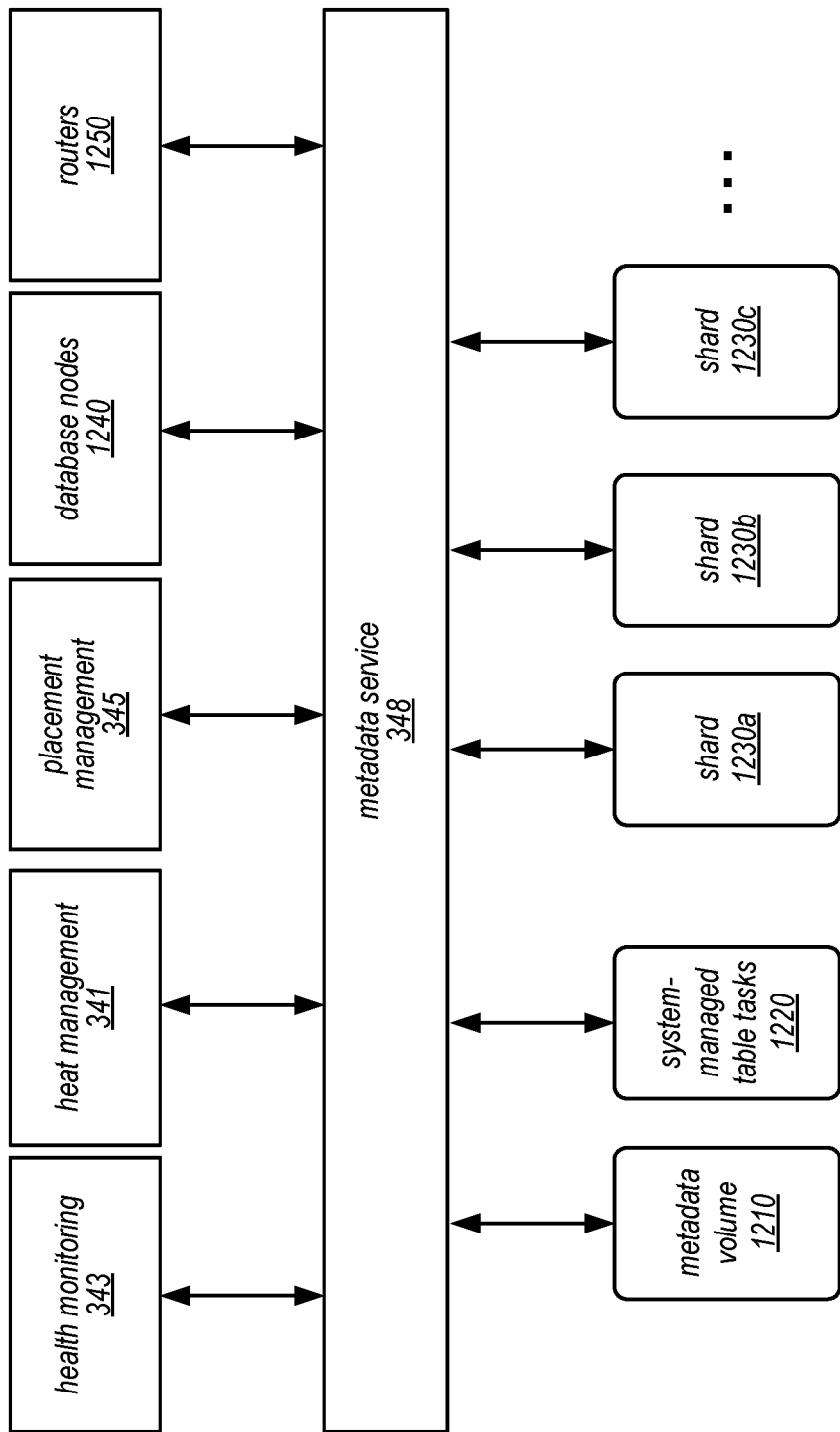
FIG. 12 is a logical block diagram illustrating a metadata service for supporting client and system-managed tables, according to some embodiments.

FIG. 12 is a logical block diagram illustrating a metadata service for supporting client and system-managed tables, according to some embodiments. Metadata service 348 may communicate with various components of the data and control planes of database service 210, such as health monitoring 343, heat management 341, placement management 345, database nodes 1240 (e.g., database nodes 320 in FIG. 3) and routers 1250 (e.g., routers 371 in FIG. 3). In this way, metadata service 348 can provide up-to-date metadata about various artifacts of the database service 210, such as metadata (e.g., metadata volume 1210), system-managed table tasks 1220 (e.g., creation, alteration, replication of client-managed tables and system-managed tables), and shards of client-managed tables, such as shards 1230*a*, 1230*b* and 1230*c*. Examples of the metadata may include the placement hierarchy and assignments of database nodes to shards or client-managed tables, the management type of tables (e.g., client or system-managed), storage volume assignments to shards, epochs or other metadata versioning information, as well as custom configurations of resources in database service 210.

In some embodiments, metadata service 348 may provide a synchronization point for metadata across routers. For example, metadata service 348 may provide metadata update propagation techniques (e.g., push-notifications, polling or other pull-based update requests, etc.) to routers. Shard or other placement hierarchy changes, data definition language (DDL) changes and shard specific metadata updates may be provided both to existing and new routers to recognize new shards. Similarly, metadata service 348 may synchronize shard-specific changes to database nodes assigned to those shards (e.g., table changes specified in DDL access requests).

Figure 13:
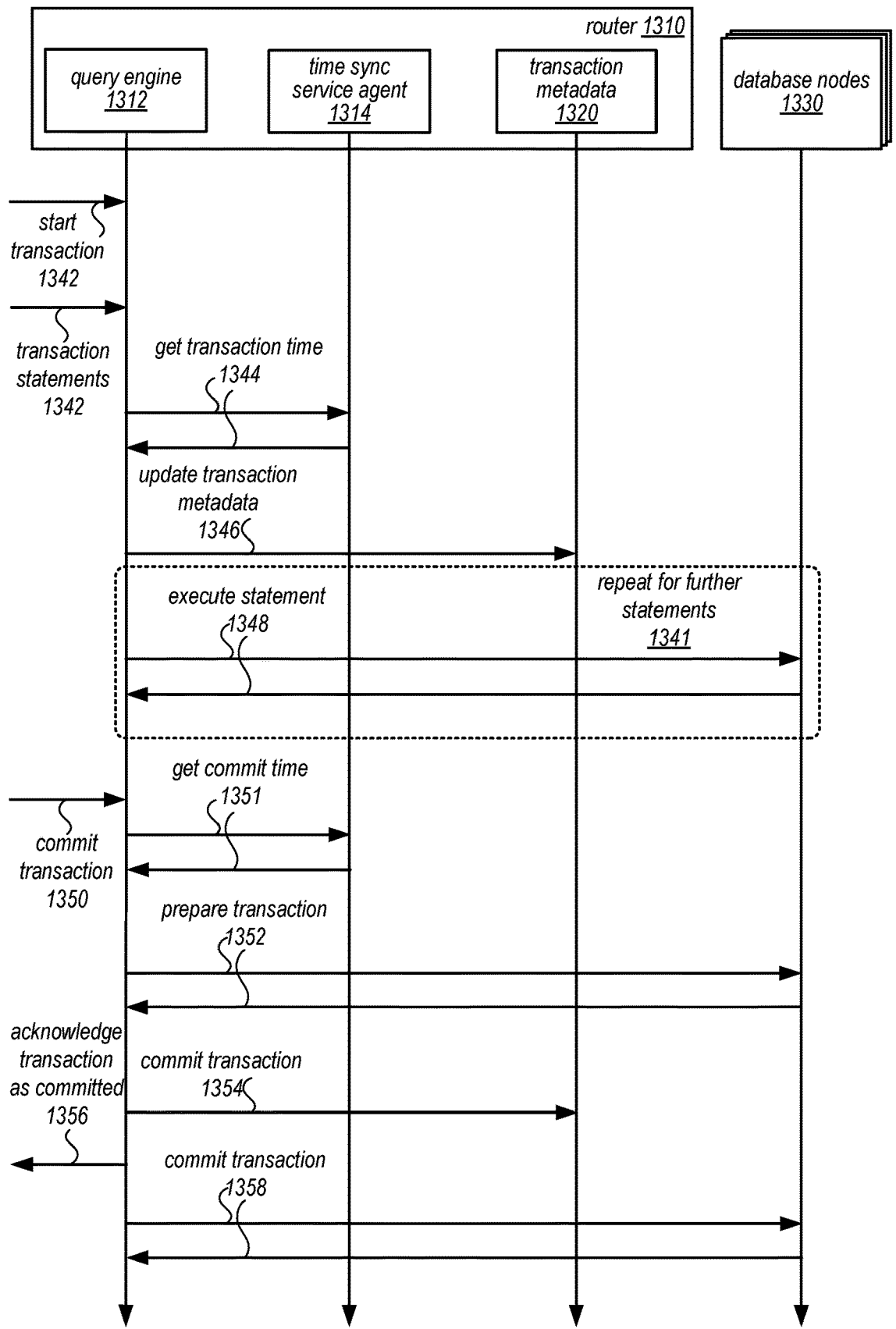
FIG. 13 is a sequence diagram illustrating a dynamically selected multi-phase commit protocol for a distributed transaction for a database, according to some embodiments.

FIG. 13 is a sequence diagram illustrating a dynamically selected multi-phase commit protocol for a distributed transaction for a database, according to some embodiments. Router 1310 may implement query engine 1312, similar to query engine 711 in FIG. 7. Query engine 1312 may receive a start transaction 1342 indication and then begin receiving transaction statements 1342. Query engine 1312 may obtain a transaction start time 1344 from time sync service agent 1314. Time sync service agent 1314 may connect to time synchronization service 240 in order to obtain a globally synchronized that is consistent across multiple locations (e.g., at different routers including router 1310). Query engine 1312 may determine other transaction context information, such as a transaction identifier and update transaction metadata 1320 on router 1310, as indicated at 1346 (e.g., including the transaction start time and transaction identifier).

Figure 17:
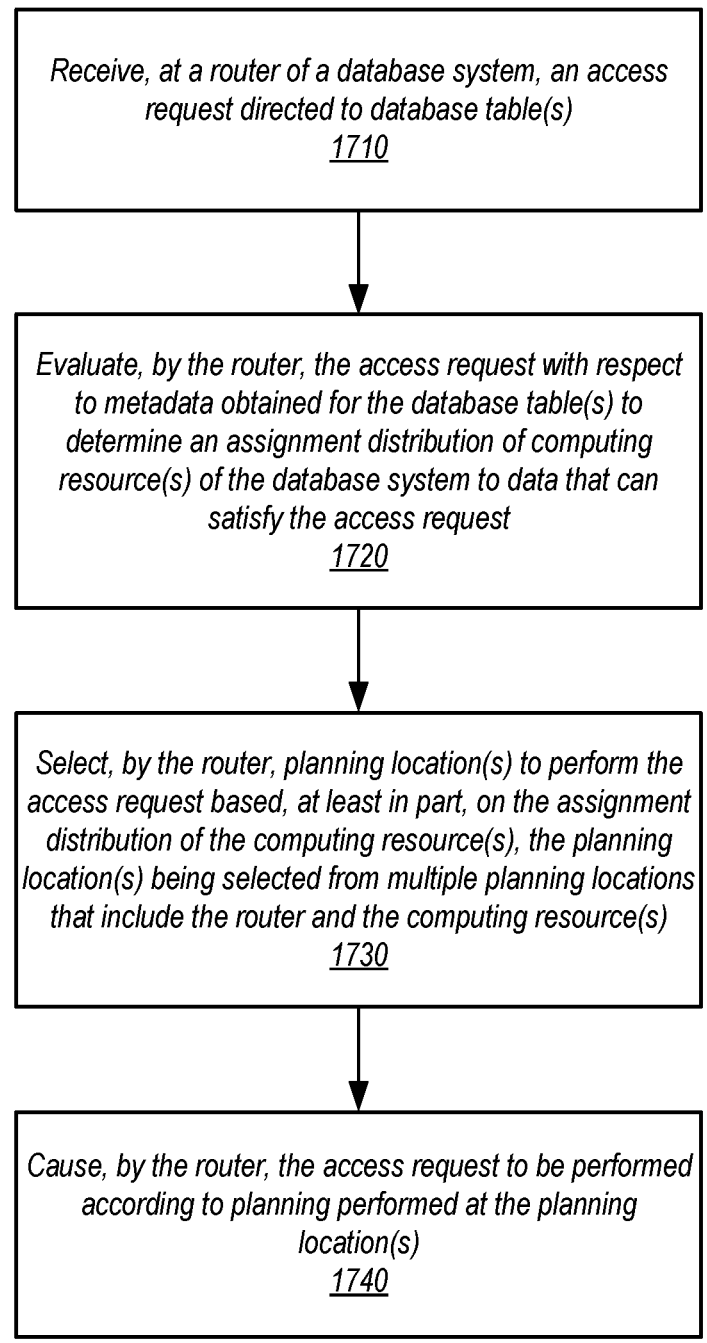
FIG. 17 is a high-level flowchart illustrating various methods and techniques to implement intelligent query routing across shards of scalable database tables, according to some embodiments.
Figure 18:
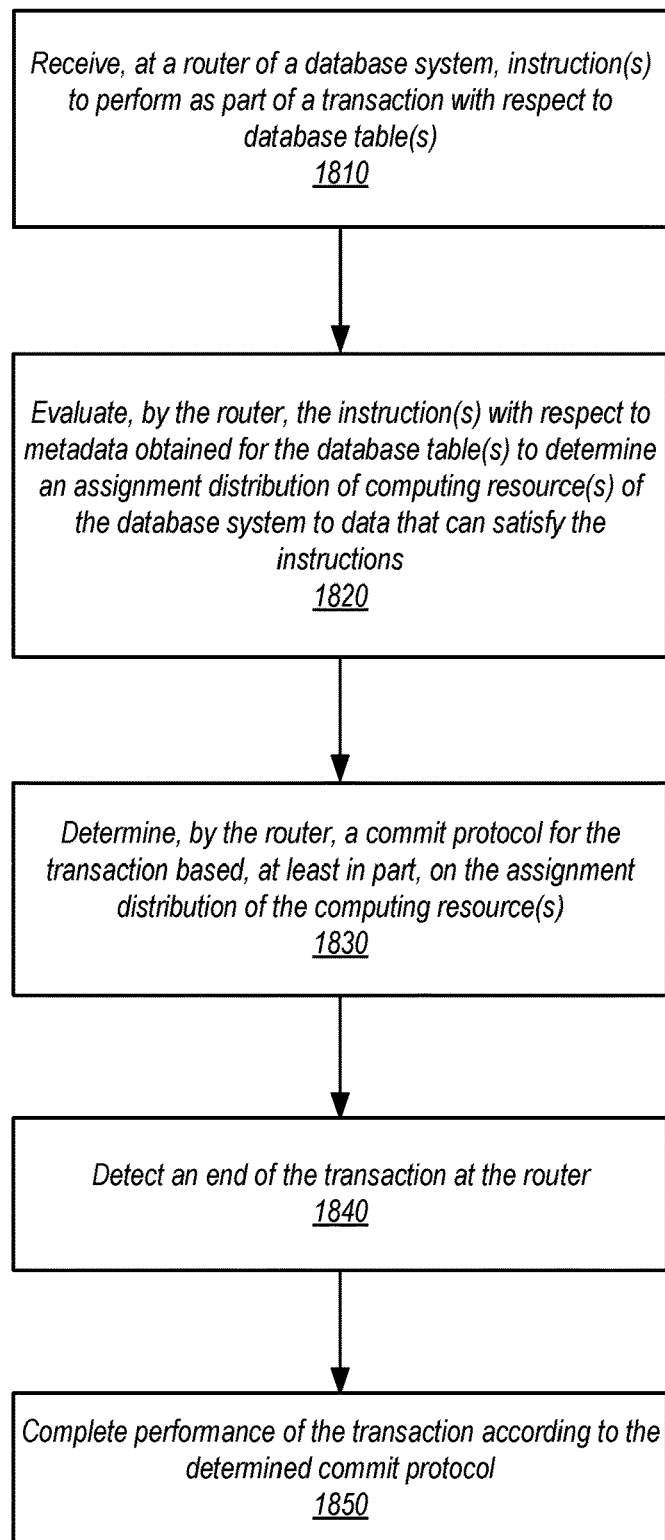
FIG. 18 is a high-level flowchart illustrating various methods and techniques to implement distributed transaction execution across shards of scalable database tables for improved query performance, according to some embodiments.

Query engine 1312 may then execute the various transaction statements as indicated at 1348 and 1341 by sending instructions to multiple database nodes 1330 (assigned to the shards or client-managed tables involved in the transaction according to the statements) according to the techniques discussed above with regard to FIGS. 7 and 8 and below with regard to FIGS. 17 and 18. The transaction start time may be provided to database nodes in order to ensure that the state of the database acted upon by the statements is supposed to be visible at the transaction start time (e.g., where the database nodes implement multi version concurrency control to provide the correct version of data).

As indicated at 1350, a commit transaction indication may be received at query engine. A commit protocol may be dynamically selected. In this example, because multiple shards or database nodes are involved, then two-phase commit protocol may be used. As indicated at 1351, the commit time may be obtained. As indicated at 1352, requests to prepare the transaction 1352 may be sent. If the prepare requests succeed, then the transaction metadata 1320 may be updated to commit the transaction, as indicated at 1352. For example, the in-memory transaction context, such as the transaction identifier, start and commit times may be written to a persistent transaction log, in some embodiments. Once committed at the router, the transaction may be acknowledged as committed, as indicated at 1356. Then, commit transaction requests and responses 1358 may be sent. In other embodiments, the acknowledgement may not be sent until the database nodes have successfully committed.

Figure 14:
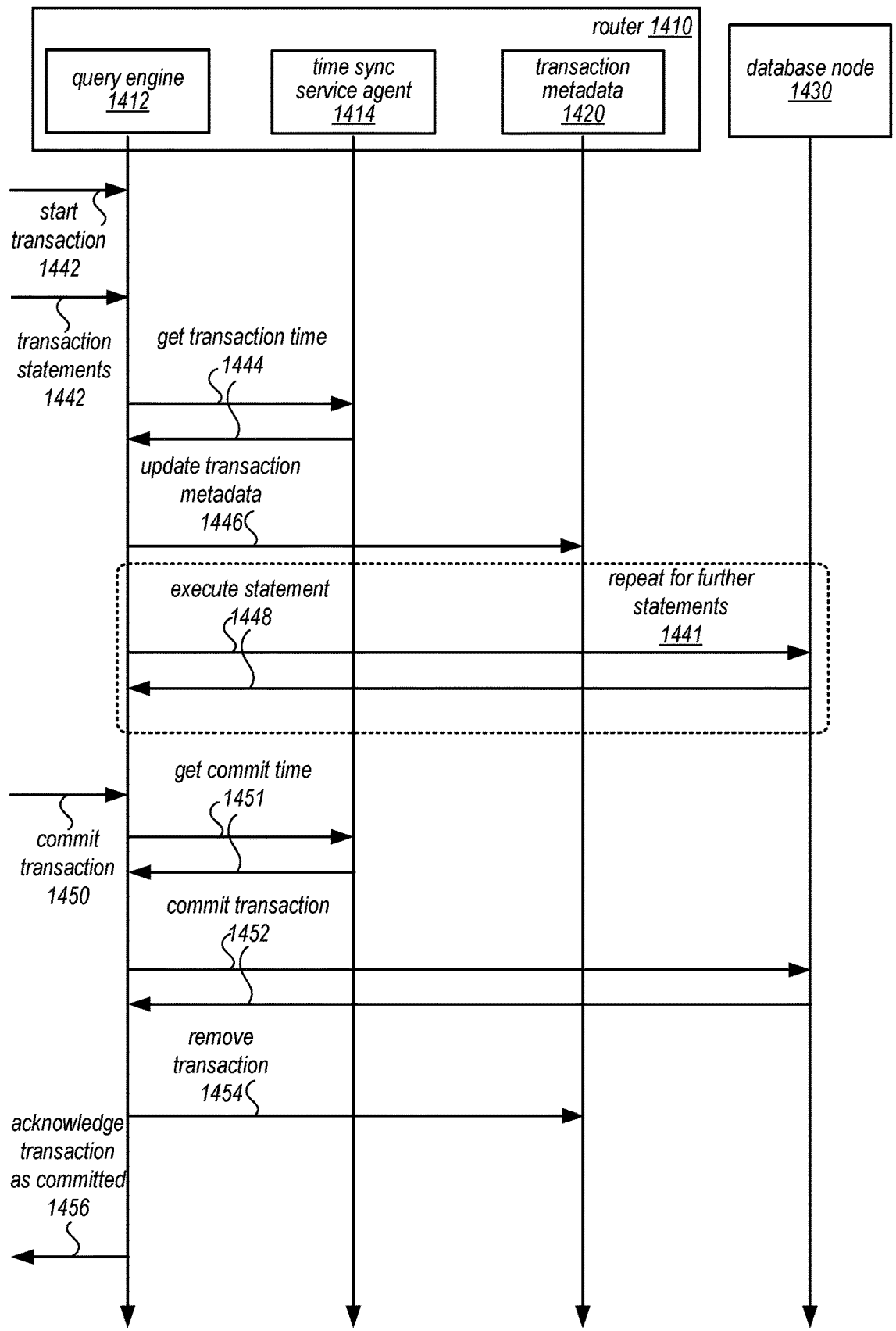
FIG. 14 is a sequence diagram illustrating a dynamically selected single-phase commit protocol for a distributed transaction for a database, according to some embodiments.

FIG. 14 is a sequence diagram illustrating a dynamically selected single-phase commit protocol for a distributed transaction for a database, according to some embodiments. Router 1410 may implement query engine 1412, similar to query engine 711 in FIG. 7. Query engine 1412 may receive a start transaction 1442 indication and then begin receiving transaction statements 1442. Query engine 1412 may obtain a transaction start time 1444 from time sync service agent 1414. Time sync service agent 1414 may connect to time synchronization service 240 in order to obtain a globally synchronized that is consistent across multiple locations (e.g., at different routers including router 1410). Query engine 1412 may determine other transaction context information, such as a transaction identifier and update transaction metadata 1420 on router 1410, as indicated at 1446 (e.g., including the transaction start time and transaction identifier).

Query engine 1412 may then execute the various transaction statements as indicated at 1448 and 1441 by sending instructions to a single database node 1430 (assigned to the shards or client-managed tables involved in the transaction according to the statements) according to the techniques discussed above with regard to FIGS. 7 and 8 and below with regard to FIGS. 17 and 18. The transaction start time may be provided to database node in order to ensure that the state of the database acted upon by the statements is supposed to be visible at the transaction start time (e.g., where the database nodes implement multi version concurrency control to provide the correct version of data).

As indicated at 1450, a commit transaction indication may be received at query engine. A commit protocol may be dynamically selected. In this example, because a single shard or database node is involved, then a single-phase commit protocol may be used. However, instead of committing the transaction locally at the router, the transaction may be committed at just the database node 1430. For example, as indicated at 1451, the commit time may be obtained. As indicated at 1452, a request to commit the transaction may be sent to database node 1430. If successful, then query engine 1312 may remove the transaction, as indicated at 1454, from transaction metadata 1420. For example, the in-memory transaction context, such as the transaction identifier, start and commit times may be flushed or otherwise discarded from memory, in some embodiments. Once committed at the database node 1430, the transaction may be acknowledged as committed, as indicated at 1456.

Figure 15:
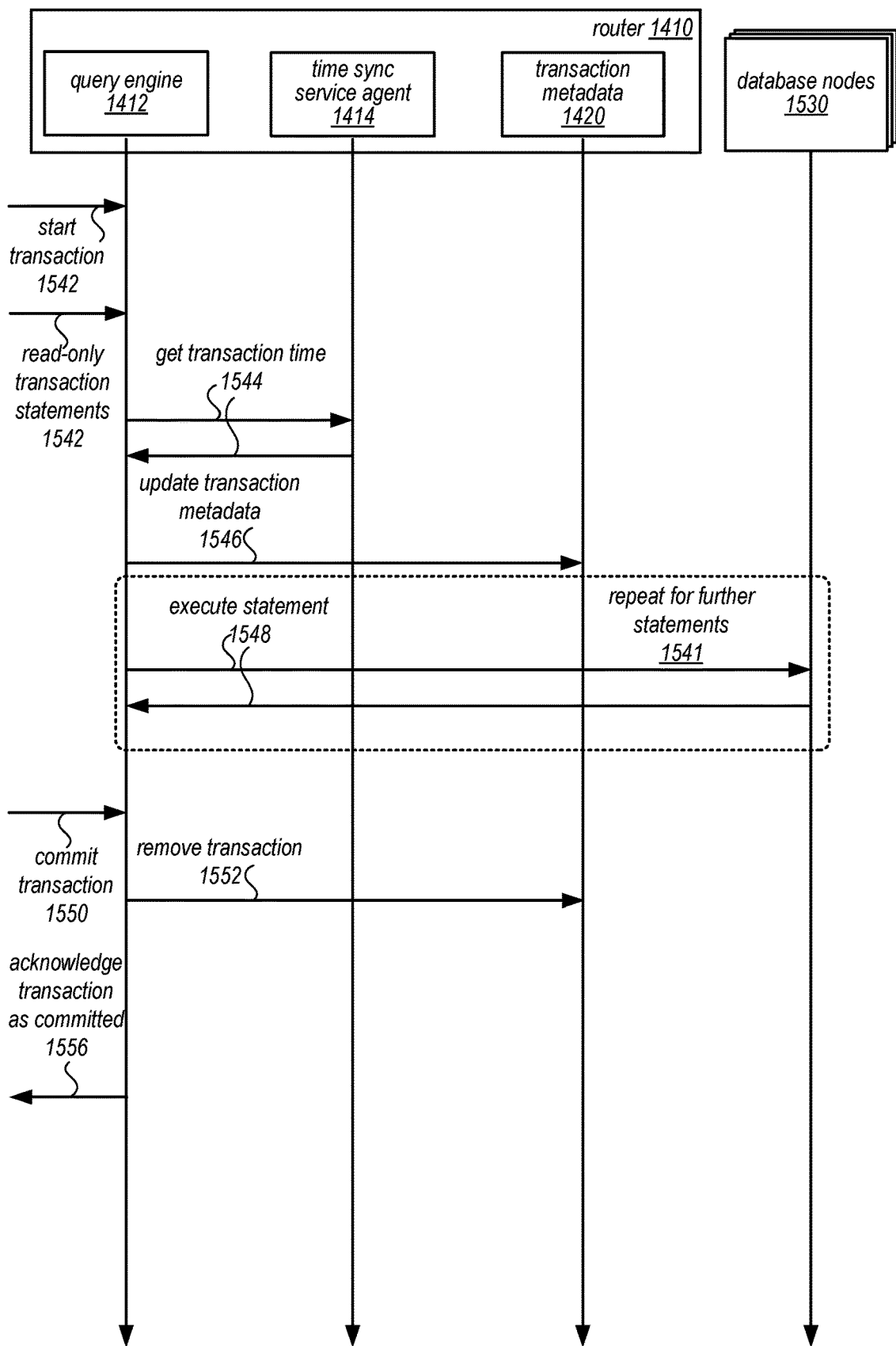
FIG. 15 is a sequence diagram illustrating a dynamically selected read-only commit protocol for a distributed transaction for a database, according to some embodiments.

FIG. 15 is a sequence diagram illustrating a dynamically selected read-only commit protocol for a distributed transaction for a database, according to some embodiments. Router 1510 may implement query engine 1512, similar to query engine 711 in FIG. 7. Query engine 1512 may receive a start transaction 1542 indication and then begin receiving read-only transaction statements 1542. Query engine 1512 may obtain a transaction start time 1544 from time sync service agent 1514. Time sync service agent 1514 may connect to time synchronization service 240 in order to obtain a globally synchronized that is consistent across multiple locations (e.g., at different routers including router 1510). Query engine 1512 may determine other transaction context information, such as a transaction identifier and update transaction metadata 1520 on router 1510, as indicated at 1546 (e.g., including the transaction start time and transaction identifier).

Query engine 1512 may then execute the various transaction statements as indicated at 1548 and 1541 by sending instructions to one or more database nodes 1530 (assigned to the shards or client-managed tables involved in the transaction according to the statements) according to the techniques discussed above with regard to FIGS. 7 and 8 and below with regard to FIGS. 17 and 18. The transaction start time may be provided to database node(s) in order to ensure that the state of the database acted upon by the statements is supposed to be visible at the transaction start time (e.g., where the database nodes implement multi version concurrency control to provide the correct version of data).

As indicated at 1550, a commit transaction indication may be received at query engine. A commit protocol may be dynamically selected. In this example, because read-only statements are involved, then the commit protocol allows the transaction to be forgotten (as the state of the database did not change). Query engine 1312 may remove the transaction, as indicated at 1552, from transaction metadata 1520. For example, the in-memory transaction context, such as the transaction identifier, start and commit times may be flushed or otherwise discarded from memory, in some embodiments. Once committed at the database node 1530, the transaction may be acknowledged as committed, as indicated at 1556.

In addition to the techniques described above, query engines on routers and database nodes may use a remote procedure call (RPC) framework for synchronization during distributed transactions. In some embodiments, the RPC framework may also be used to update database statistics for various objects, such as foreign tables or indexes, and during various operations (e.g., a vacuum process to remove data marked as deleted). Such synchronization of this data using the RPC framework may be performed in asynchronous fashion, in some embodiments, from database nodes to routers. In this way, the RPC framework can be used as a lightweight protocol for cases when transactions are not needed (e.g., single database node updates, as discussed above with regard to FIG. 14) so that an additional database connection does not have to be maintained for performing such data updates.

Figure 16:
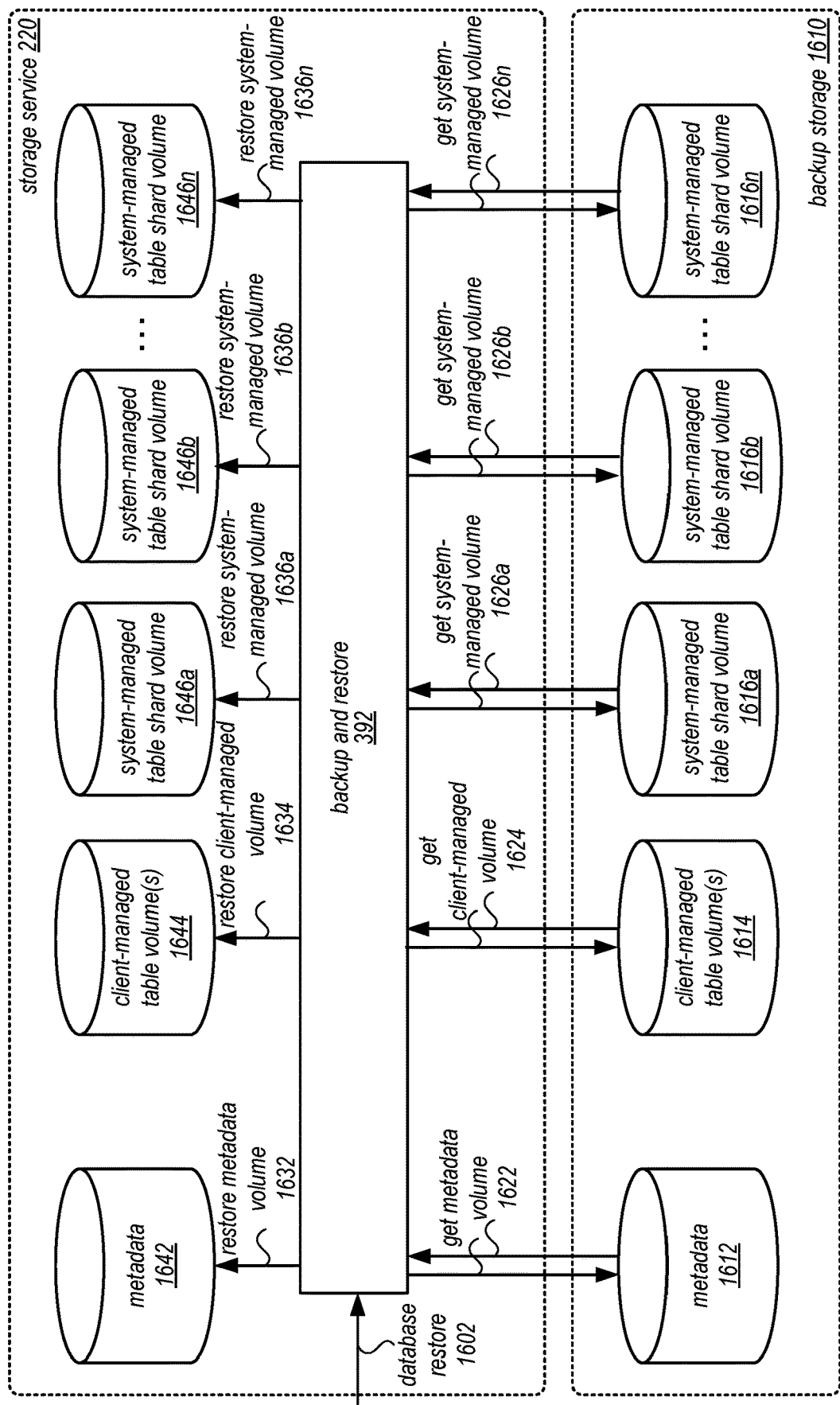
FIG. 16 is a logical block diagram illustrating backup and restore as part of storage management for a data storage service, according to some embodiments.

FIG. 16 is a logical block diagram illustrating backup and restore as part of storage management for a data storage service, according to some embodiments. Backup and restore 392 may be responsible for coordinating the creation of backup copies of storage volumes as well as performing restore operations (or other similar operations such as cloning a database) in order to make storage volumes for a database available. Backup and restore 392 may manage or direct a background process on storage nodes (or other computing resources) to create backup copies of volumes in backup storage 1610, in some embodiments. Backup storage 1610 may be a separate storage service, in some embodiments, such as an object-based storage service, data-lake storage service, or other type of storage that may be implemented on one of other service(s) 230 discussed above with regard to FIG. 3. In at least some embodiments, backup and restore 392 may enforce or instruct backup policies or other backup configuration for a database. For instance, the different volumes for shards or client-managed tables may be backed up at different intervals according to a policy in order to reduce storage costs. In some embodiments, these backup policies may be applied on groups of aligned tables (e.g., those tables co-located on a shard, as discussed above with regard to FIG. 5.

As indicated at 1602 a database restore request may be received at backup and restore 392. This request may be triggered by a request to database service 210 (e.g., to a control plane or other component for the database service) to create a point in time restore for a database. Backup and restore 392 may execute or perform various workflows to complete a restore operation. A restore request 1602 may include various features for the restore operation that provide various configuration or other information for performing the restore operation. For example, the configuration information may specify various storage locations, resources, or other attributes of the restored database (e.g., to be restored in a certain fault tolerance zone of a provider network). In some embodiments, the configuration information may include a selection of a subset of data to restore for one or more tables. The potentially large size of system-managed tables, for instance, may make it desirable only to restore a portion of a system-managed table. Thus, the request may specify the subset of one (or more tables to restore). A shard key range (or other table row value or column value range may be specified in some embodiments. The request may specify the point in time (e.g., as date and time format, such as timestamp).

Backup and restore 392 may implement the various techniques discussed in detail below with regard to FIG. 21. For example, backup and restore 392 may restore metadata 1612 (either from a separate storage volume, metadata service, or portions stored alongside or as part of table volume(s) 1614, and shard volumes 1616a, 1616b and 1616n. Backup and restore 392 may then restore the metadata volume as indicated at 1632. For example, a point in time, may be used to determine a globally synchronized timestamp that corresponds to a change log for the metadata 1612, which may then be used to apply any changes not already included in the backup copy of the metadata up to the corresponding log record of the timestamp that provides a consistency point for the point in time in order to produce the restore metadata volume 1632.

Using the metadata 1642, backup and restore 392 may get the client managed volume 1624 from backup storage 1610 copy, client-managed table volumes 1614, apply redo log records for a redo log for the volume up to an LSN that provides a consistency point for the point in time, as determined from mappings between globally synchronized timestamps and LSNs for the redo log records to restore 1634 client-managed table volume(s) 1644. Similar techniques may then be applied for the different system-managed table shards. For example, system-managed table shard 1616*a*, system-managed table shard 1616*b* through system-managed table shard 1616*n* may be retrieved, as indicated at 1626*a*. 1626*b*, and 1626*n* respectively. Then the consistency points for the different shard volumes may be determined, which be correspond to different LSNs as each redo log may have different numbers of changes and be performed at different times. These consistency points may be the closest consistency point (e.g., less than or equal to) the point in time of the restore and thus may still provide a consistent view of the database across the client and system-managed tables. Once the respective portions of redo log have been applied, backup and restore 392 may respectively restore, as indicated at 1636*a*, 1636*b*, and 1636*n*, the system-managed table shard volumes 1646*a*, 1646*b*, and 1646*n*.

Although not illustrated, the control plane 347 of database service 210 may provision database nodes using a same assignment distribution as indicated by a placement hierarchy for the tables. Instructions to attach the restored storage volumes may be performed as well as various recovery operations to create an internal state (e.g., data structures, transaction tables, etc.) of the various components of database nodes. Similarly, control plane 347 may ensure that a number of request routers for the database are provisioned or available may provide access to (or indicate to these routers) the metadata for routing access requests as discussed above.

The database service and storage service discussed in FIGS. 2 through 16 provide examples of a database system that may implement client-managed tables and system-managed tables in a database. However, various other types of database systems may implement client-managed tables and system-managed tables in a database. FIG. 17 is a high-level flowchart illustrating various methods and techniques to implement intelligent query routing across shards of scalable database tables, according to some embodiments. Various different systems and devices may implement the various methods and techniques described below, either singly or working together. For example, a database service and storage service as discussed above may implement the various methods. Alternatively, a combination of different systems and devices may implement the various techniques. Therefore, the above examples and or any other systems or devices referenced as performing the illustrated method, are not intended to be limiting as to other different components, modules, systems, or configurations of systems and devices.

As indicated at 1710, an access request may be received at a router of a database system that is directed to one or more database tables, in some embodiments. For example, an access request may be a query, request to write, read, modify, update, or otherwise modify database tables, either as a modification or access of the data of the table(s) or the schema of the table(s) (e.g., for a DDL request).

As indicated at 1720, the router may evaluate the access request with respect to metadata obtained for the database table(s) to determine an assignment distribution of computing resource(s) of the database system to data that can satisfy the access request, in some embodiments. For example, a router may synchronize a local (or remote) copy metadata, such as table catalog, using a metadata service, like metadata service 348. The assignment distribution may be a mapping of shards of system-managed tables and client-managed tables to different database nodes. Those portions of the table(s) that can satisfy the access request may be determined according to query parsing and analysis techniques discussed above with regard to FIG. 7.

As indicated at 1730, the router may select one or more planning locations to perform the access request based, at least in part, on the assignment distribution of the computing resources, in some embodiments. For example, multiple possible planning locations may include both the router and the database nodes assigned to different shards or client-managed tables. Different criteria for selecting planning locations may be applied. One example criteria may be that for single shard or single database node access requests, planning may be performed at the assigned database node (of the shard or client-managed table). Another example criteria may be that for multiple database nodes, query planning may be performed at the router. Further criteria may be used in combination with the above examples. For instance, while multiple database nodes may cause an initial planning location selection of the router, another criteria may modify the decision if the number of database nodes exceeds a threshold amount (e.g., as a high number of database node planning at the router may prevent the router from handling other requests and it may be more efficient to allow the access request to be planned in parallel at the multiple database nodes involved).

As indicated at 1740, once selected, the router may cause the access request to be performed according to the planning performed at the planning location(s), in some embodiments. For example, instructions alone may be sent to database nodes, or portions of a query plan (or all of an access request) may be sent according to different planning location selections. The router may aggregate results, in some embodiments, and return them to a client application.

Transactions are a feature of databases that allow for multiple different instructions to read and/or write to a database, such the instructions succeed or fail together. Because a database may have both system-managed tables across multiple shards and client-managed tables at a single location, implementing transactions for such databases may make use of dynamic protocol selection in order to determine how to correctly and efficiently handle transactions. In this way, the database system may offer the valuable transaction feature that meets expected transaction performance while also offering multiple management types of tables within a single database. FIG. 18 is a high-level flowchart illustrating various methods and techniques to implement distributed transaction execution across shards of scalable database tables for improved query performance, according to some embodiments.

A transaction may begin with a request to start a transaction (or some request that implicitly indicates the start of a transaction) with respect to one or more tables of a database. As discussed above, routers of a database system, like database service 210, may handle such requests. Once started, various features of the transaction context may be determined and stored, at least temporarily, as transaction metadata. For example, a start time value for the transaction may be determined according to the time synchronization service as well as a transaction identifier. In some embodiments, this information may be stored locally at the router (e.g., in memory).

As indicated at 1810, instruction(s) to perform as part of the transaction with respect to one or more database tables may be received at the router. These instructions may be specified as various commands, invocations or other operations to perform. In some embodiments, these instructions may be specified as statements in a query language such as SQL.

When received, the instructions may be evaluated by the router with respect to metadata obtained for the database table(s) in order to determine an assignment distribution of computing resource(s) of the database system to data that can satisfy the instructions. For example, the shard assignments to database nodes may be considered as described in metadata obtained from a metadata service or volume that has been synchronized at routers including the router. The metadata may be a catalog or other mapping of database nodes and shards to data.

As discussed in detail above with regard to FIGS. 13-15, different commit protocols may be used for different transactions. These may be determined according to the determine assignment distribution, as indicated at 1830, in some embodiments. For example, as discussed above with regard to FIG. 13, a two-phase style commit may be performed when multiple database nodes are involved, and a single-phase style commit when one database node is involved, as indicated at FIG. 14. The type of instructions may also impact the commit protocol. A read-only transaction, for example, may be handled different, as discussed above with regard to FIG. 15. Because a router can dynamically adapt the commit protocol to the transaction, the database system can utilize the most performant technique to complete the transaction without violating transaction properties.

As indicated at 1840, an end of the transaction may be detected at the router. For example, a commit request may be detected, in some embodiments. In some embodiments, other protocols or communications may signal the end of a transaction (even if there is not explicit request to commit the transaction). As indicated at 1850, performance of the transaction may be completed according to the determined commit protocol, in various embodiments, as exemplified above with regard to FIGS. 13-15.

Specifying table management types for individual database tables offers unique opportunities to take advantage of different arrangements of data for optimal access request processing. Co-location is one form optimization for queries, for example, that join or access data with similar values. Co-location can occur in different ways. As discussed below with regard to FIG. 20, co-location can occur as part of aligning different system-managed tables on shards of the system-management tables. Another aspect of co-location can occur when a commonly accessed client-managed table is co-located with the shards of a system-managed table. Identifying and storing the client-managed table with different shards of the system-managed table can reduce the number of network hops and/or distributed execution across shards that is performed. For instance, instead of performing a query using both a database node for the client-managed table and a shard of the system-managed table, the entire query can be performed at the database node assigned to the shard of the system-managed table.

Figure 19:
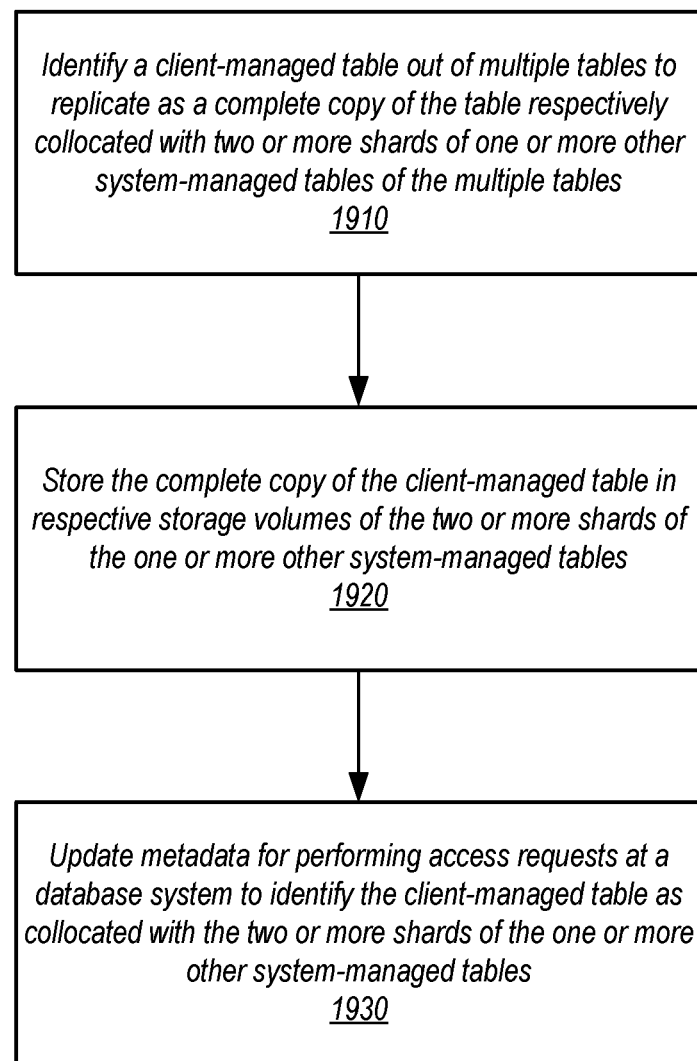
FIG. 19 is a high-level flowchart illustrating various methods and techniques to implement configuring replication across shards of scalable database tables for improved query performance, according to some embodiments.

FIG. 19 is a high-level flowchart illustrating various methods and techniques to implement configuring replication across shards of scalable database tables for improved query performance, according to some embodiments. As indicated at 1910, a client-managed table may be identified out of multiple tables of a database to replicate as a complete copy of the table respectively collocated with two or more shards of one or more other system-managed tables of the multiple tables of the database, in some embodiments. Identifying the client-managed table may be performed in various ways. In some embodiments, a request received at a database system may specify or otherwise identify the client-managed table to be replicated.

In other embodiments, the client-managed table may be automatically identified by the database system. For example, query history for the database may be evaluated to recognize a pattern of frequent joins between the client-managed table and the system-managed table. If, for instance, the frequency exceeds a threshold and other replication criteria are met, such as the client-managed table not exceeding certain size thresholds, then the table may be identified for replication to shards of the system-managed table, in some embodiments.

As indicated at 1920, the complete copy of the client-managed table may be stored in the respective storage volumes of the two or more shards of the one or more other system-managed tables, in some embodiments. For example, a background migration or copy process may access the data in the client-managed table storage volume and store the data to the corresponding shard storage volumes.

In some embodiments, the database system may determine which shards of the system-managed table should receive a copy. Not all shards, for instance, may receive a copy in some scenarios. For example, if the client-managed table corresponds to data within a certain period of time, then only those shards that store data within that period of time may have the copy stored. Other types of analysis based on join history or other affinities that may exist between the client-managed table and the individual shards of the system managed table may be performed in some embodiments. In some embodiments, the client-managed table may be copied to only a single shard of the system-managed table.

As indicated at 1930, metadata for performing access requests at a database system may be updated to identify the client-managed table as collocated with two or more other shards of the one or more other system-managed tables. For example, metadata may be maintained by a metadata service and/or in a metadata volume that is accessible to routers of the database system. Updates to the metadata service and/or metadata volume may be made to reflect the copies of the client-managed table.

In some embodiments, making the copy of the client-managed table in the storage volume of shard(s) of the system-managed tables may enable or trigger replica of future updates to the client-managed table copies. For example, logical replication techniques where change log records are sent to be applied by the database nodes assigned to the shards (or to storage nodes of the storage volumes for the shards) may be performed. In some embodiments, the database node of the client-managed table may forward or send updates originally performed by the database node to those database nodes assigned to the shards storing copies of the replicated client-managed table. In some embodiments, physical replication techniques may be implemented. For example, where data pages or other data storage units of a storage volume that are updated at a client-managed table are replicated to and used to overwrite the corresponding data page (or other data structure) at the storage volumes of the shards storing the respective copies.

System-managed tables may offer a database system, like database service 210, the ability to scale our various components of the database system to handle changing demands of workload and storage for the system-managed table. For example, as discussed above, changes in the assignment of database nodes to better distribute workload may be made (as well as the addition of new database nodes to add compute capacity or removal of database nodes to eliminate unused compute capacity) and/or increases in the number of shards to provide additional storage for the table allowing the table to grow in a limitless fashion. As discussed above with regard to FIGS. 9 and 10, these operations may utilize a placement hierarchy to determine where to place data or as a data structure for determining how to make distribution changes according to the various granularities offered by the placement hierarchy. In this way, a database system has many different possible scaling changes that can be made to adjust compute and storage capacity for a system-managed table, improving the efficiency and performance of the database system without wasting resources. For example, shard splits and other movements within or changes to the placement hierarchy can support single shard key storage volumes so that frequently accessed data can receive optimal access times. Replication may also include detecting new shards of the system-managed table and adding a copy of the client-managed table in some embodiments as well as updating the metadata, as discussed above.

Figure 20:
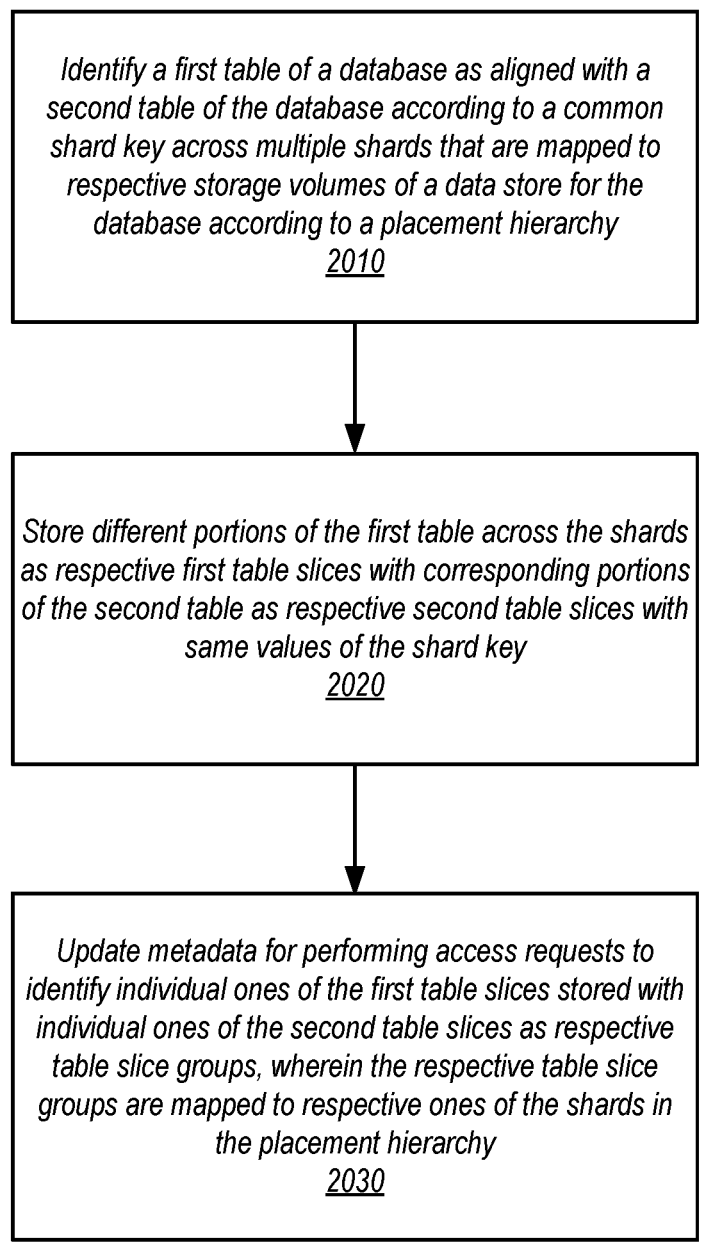
FIG. 20 is a high-level flowchart illustrating various methods and techniques to implement shard management for scaling database tables according to a placement hierarchy, according to some embodiments.

FIG. 20 is a high-level flowchart illustrating various methods and techniques to implement shard management for scaling database tables according to a placement hierarchy, according to some embodiments. As indicated at 2010, a first table may be identified as aligned with a second table of a database according to a common shard key across multiple shards. A shard key may be a single column value or a composite shard key made of multiple column values (e.g., concatenated together for evaluation purposes). The shards may be may be mapped to a storage volume (e.g., one or multiple shards to a storage volume as illustrated in FIG. 10) according to a placement hierarchy. The placement hierarchy may be representative of the assignment of database nodes or other compute resources to a shard (or multiple shards) of a system-managed table.

Tables, such as the first table and the second table, may be identified as aligned according to a request, in some embodiments. For example, a request to create a table as system-managed table or alter an existing table as a system-managed table, as discussed above with regard to FIG. 4, may include one or more features that identify the first table and second table as aligned. In some embodiments, the database system may automatically determine the alignment. For example, a comparison of column values for the tables may identify a foreign key or other affinity between the tables to identify them as aligned. In some embodiments, alignment may be identified based on an evaluation of access patterns (e.g., query history that joins these columns on a same column value).

As indicated at 2020, different portions of the first table may be stored across the shards as respective first table slices with corresponding portions of the second table as second table slices with same values of the shard key, in some embodiments. For example, techniques, such as a hash range technique may be implemented using hash key values of the shard key mapped to different table slice groups, as depicted in FIG. 10, which may allow for identifying the same rows of the aligned tables with shard keys that hash to (e.g., produce hash values using the hash function applied to the value stored in the column(s) that are the shard key). For example, a hash range technique may apply the hash function to generate a 32 or 64 bit value. A hash value range in which the hash value is located is then identified and the mapping of that hash value range to a table slice determines the location of the row that produced that hash value in the placement hierarchy. Hash range may increase the variety of data types that can be used for the shard key and achieve predictability for key distribution, which improves query routing and heat management.

As indicated at 2030, metadata for performing access requests may be updated to identify individual ones of the first table slices stored with individual ones of the second table slices, in various embodiments. The respective table slice groups may be mapped to respective ones of the shards in the placement hierarchy, in some embodiments.

Placement of data according to the techniques described above may occur in different scenarios. For example requests to create or alter a table into a system-managed table may cause placement, which redistributes or stores new data as it is received according to the techniques discussed above. Heat management and other techniques for distributing (or redistributing) data may make use of the placement hierarchy and may include altering the placement hierarchy, in some scenarios. For example, metrics for CPU, memory, network, disk I/O, and other utilization may be collected, analyzed, and translated into computational units for making management decisions, including attaching and detaching at various levels of the hierarchy (e.g., at table slice group, volume group, etc.) may be made according to the techniques discussed above in order to efficiently move data from one location to another for improved database system performance.

Utilizing a mix of client-managed and system-managed tables supports many different scenarios where optimal database performance may include some large scale tables (e.g., stored in system-managed tables) and smaller (or relatively smaller) tables (e.g., stored in a client-managed table). Because the performance of various access requests on these different tables may occur in many different ways, as discussed above, determining a consistent state of the different management types of tables may have to ensure that in spite of the various ways in which access requests are handled the consistent state of the database is accurately consistent across the different types of management. Supporting such consistent state determinations allow for the implementation of useful restore and cloning operations in such databases, that may make use of creating a new or additional copy of a database that includes both types of tables. Thus techniques that can restore client-managed and system-managed database tables may improve the capability of a database system that implements both types of tables to provide these useful operations.

Figure 21:
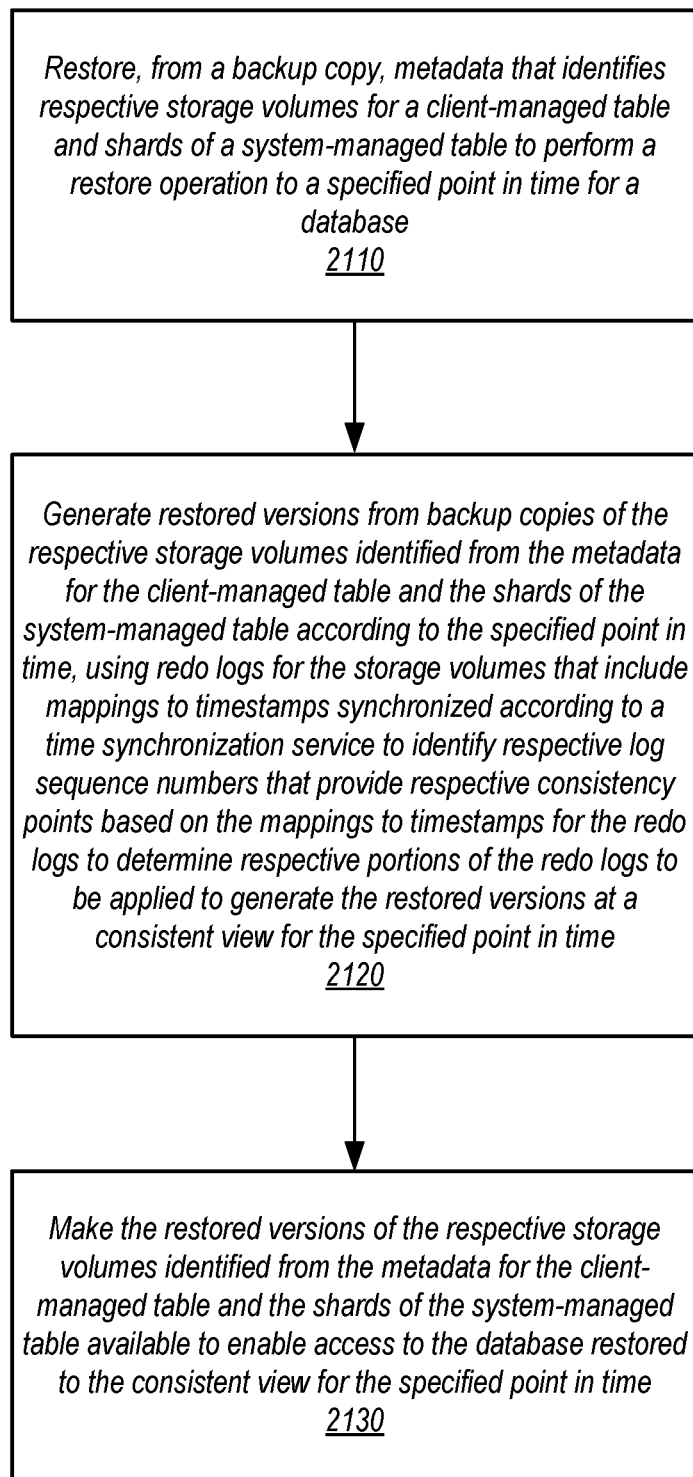
FIG. 21 is a high-level flowchart illustrating various methods and techniques to implement backup and restore of client-managed and system-managed database tables, according to some embodiments.

FIG. 21 is a high-level flowchart illustrating various methods and techniques to implement backup and restore of client-managed and system-managed database tables, according to some embodiments. A restore operation may be requested or otherwise received and utilize to provide access to a database as of a point in time. This restore operation may be used to bring back a database that failed or was corrupted in order to continue operation at a point in time prior to the failure or corruption. In some embodiments, this restore operation may be performed to clone the database in order to make a new copy of the database for a specified point in time available (e.g., for additional testing, development, or other use cases where an additional database copy may be used).

A request to perform a restore operation may be received via a database system control plane (e.g., via an interface like interface 402 in FIG. 4 discussed above), which may include various types of interface (e.g., graphical, command line, API or other programmatic interface, etc.). The parameters or features of the request for the restore operation may include various configuration or other information for performing the restore operation. For example, the configuration information may specify various storage locations, resources, or other attributes of the restored database (e.g., to be restored in a certain fault tolerance zone of a provider network). In some embodiments, the configuration information may include a selection of a subset of data to restore for one or more tables. The potentially large size of system-managed tables, for instance, may make it desirable only to restore a portion of a system-managed table. Thus, the request may specify the subset of one (or more tables to restore). A shard key range (or other table row value or column value range may be specified in some embodiments. The request may specify the point in time (e.g., as date and time format, such as timestamp).

In some embodiments, the point in time may be selectable from a display or listing of available points in time to which the database may be restored. For instance, different granularities of points in time may be restorable according to a backup configuration or policy that is applied to the database. In some embodiments, different backup policies may enable and/or indicate which and how portions of a database table are backed up. For example, a backup policy may be specific to one or more system-managed tables (e.g., aligned tables as discussed above with regard to FIG. 10), which may have more (or less) available points in time for restoration.

As indicated at 2110, metadata that identifies respective storage volumes for a client-managed table and shards of a system-managed table may be restored from a backup copy to perform a restore operation to a specified point in time for a database. The metadata for a database may be maintained in different ways, as discussed above. For instance, the metadata may be maintained in a separate metadata volume stored in the data storage service, similar to data for client-managed tables and shards on respective volumes. In some embodiments, metadata may be stored alongside the different respective table data (e.g., on client-managed table volumes and shard volumes). In some embodiments, a metadata store or storage service which operates a metadata store may be used to provide a separate storage location for metadata for a database (e.g., separate from the data storage service for database table data). The backup copy of this metadata may be in each of the described locations above or in a separate data store (e.g., another type of data storage service, such as an object storage service, file storage service, etc.) which may be accessible to read and retrieve the metadata.

The metadata may be restored to the specified point in time. For example, a log of changes to the metadata (e.g., including DDL changes) may be indexed to global timestamps or time values synchronized according to a time synchronization service, as discussed above. Thus, the copy of the metadata may be recreated by applying the log of changes to an earlier version of the metadata (earlier than the point in time) to advance the state of the metadata up to the point in time.

As indicated at 2120, restored versions from backup copies of the respective storage volumes identified from the restored metadata for the client-managed table and the shards of the system managed table may be generated, in some embodiments. To generate restored versions, different respective consistency points may be determined for each redo log that are respectively used to store changes to the storage volumes for the client-managed table and the shards of the system-managed table. For instance, as illustrated above in FIG. 3, a storage volume may have data and a log corresponding to the data (e.g., table data and a log or metadata and a log). The log may have log sequence numbers (LSNs) for each record, which may represent a logical ordering of the records in the log (e.g., a monotonically increasing numbers). However, because each portion of the database, the shards and the client-managed tables, may have separate logs, one LSN in one log may not be a change that creates a consistent state with respect to the same LSN in the other logs. Therefore, to determine consistency points for the redo logs for the storage volumes, mappings between timestamps and LSNs of the logs may be maintained at each storage volume.

As discussed above with regard to different distributed transaction processing techniques, a time synchronization service may be used in some embodiments to provide a synchronized time across different routers (or other database system components) that make changes to the database (e.g., to both client-managed and system-managed tables in the database). A time obtained at any one of the different routers that makes changes to the database can then be consistent with the time at other ones of the different routers. In this way, a timestamp (or other time value) assigned to an action (e.g., a transaction or other change to a database (e.g., that causes a new log record to be stored in the redo log) can be compared with the timestamps of other actions to determine which actions are consistent (e.g., should be included in the database) across the different storage volumes for the specified point in time. In various embodiments, the timestamps received at storage volumes for performing different access requests may be mapped to an LSN of a log record to determine which log record describes which change to be included at a time. These mappings provide consistency points across the entire database for different points in time (e.g., a consistency point may be the mapping between an LSN for a log at one storage volume). When consistency points are found for each storage volume for both the client-managed table and system-managed table that correspond to the point in time, then it can be known which portions of the respective redo logs should be applied to copies of storage volumes to produce the storage volumes that provide a consistent view of the database (even though should portions of the respective redo logs may have different LSN ranges).

Consider an example where a specified point in time is 9:00:00 AM 1/1/2022. Each log corresponding to a volume to be restored may have a closest timestamp mapping less than or equal to (but not exceeding) the specified point in time (e.g., 8:57:23 AM 1/1/2022 mapping to LSN 14549 for volume A, 8:59:56 AM 1/1/2022 mapping to LSN 13267 for volume B, and 8:58:05 AM 1/1/2022 mapping to LSN 14701 for volume C), which may provide respective consistency points for the specified point in time for the database for each storage volume. The backup copies of each of these storage volumes may also have an LSN value (e.g., 13209 for volume A, 13202 for volume B, and 14698 for volume C), which may be less than the LSN value of the timestamp mappings. In order to generate the restored versions of the volumes, the log records for each log that occur after the LSN values of the backup copies and up to the respective consistency point LSN values may be applied (in order) to the respective backup copies (which may be first copied to a new location, such as a new storage node volume that is empty). As a result each storage volume may be restored to a consistent view of the database at the specified point in time, even though different tables in the database may be managed differently, accessed differently, and updated differently (e.g., according to different selected commit protocols as discussed above).

As indicated at 2130, the restored versions of the respective storage volumes identified from the metadata for the client managed table and the shards of the system managed table may be made available to enable access to the database restored to the consistent view for the specified point in time. For example, the storage volumes may be mounted, attached, or otherwise connected to database nodes or other database system components that can access the storage volumes and begin performing access requests to one or more of the tables. In some embodiments, the restore operation may include provisioning database nodes and router nodes to provide the same operations as discussed above. For example, the restored metadata may be made available to routers to begin handling access requests according to the techniques discussed above.

Although the above techniques describe a restore operation for full database table restoration, in some embodiments, similar techniques can be applied to restore a subset of table data (e.g., of system-managed table data). For instance, one a shard is restored, then certain data can be filtered out or removed according to the criteria of the subset (e.g., column values). In some embodiments, entire shards can be eliminated from restoration according to the criteria of the subset. The placement hierarchy, as discussed above, may provide mapping to identify which shards (or portions of shards) should be restored.

In some embodiments, conversions or other operations may be performed as part of a restore, such as changing from one type of table management to another (e.g., client-managed to system-managed, or system-managed to client-managed). For example, once restored, then a migration or placement operation may be performed to change data from one storage volume to another according to the desired conversion (e.g., splitting a volume into shards, or combining shards into a single storage volume).

The methods described herein may in various embodiments be implemented by any combination of hardware and software. For example, in one embodiment, the methods may be implemented by a computer system (e.g., a computer system as in FIG. 22) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 22:
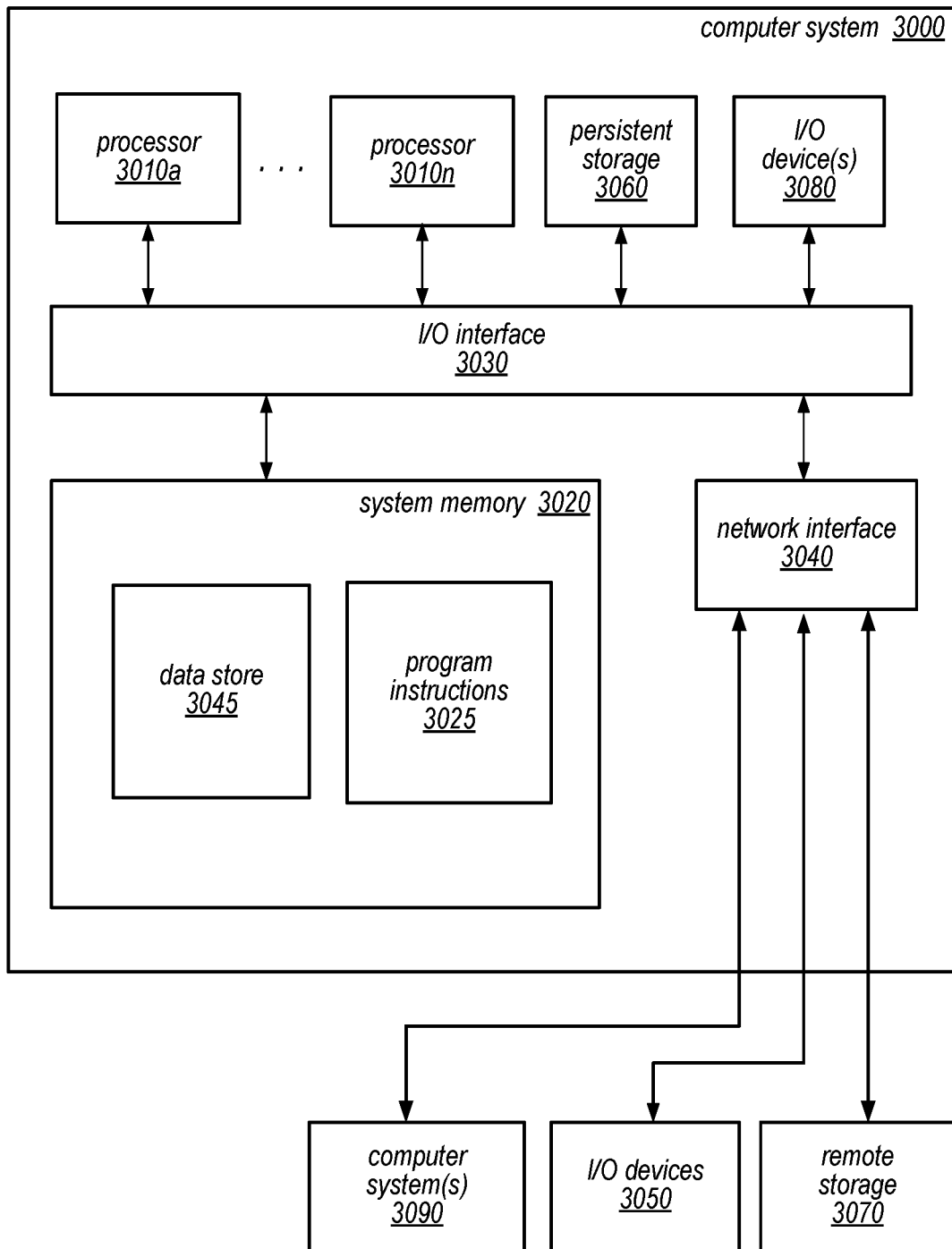
FIG. 22 is a block diagram illustrating an example computer system, according to various embodiments.

FIG. 22 is a block diagram illustrating an example computer system that may implement the various techniques discussed above with regard to FIGS. 1-21, according to various embodiments described herein. For example, computer system 3000 may implement a database node, router, and/or a storage node of a separate storage system that stores database tables and associated metadata on behalf of clients of the database tier, in various embodiments. Computer system 3000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 3000 includes one or more processors 3010 (any of which may include multiple cores, which may be single or multi-threaded) coupled to a system memory 3020 via an input/output (I/O) interface 3030. Computer system 3000 further includes a network interface 3040 coupled to I/O interface 3030. In various embodiments, computer system 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA. The computer system 3000 also includes one or more network communication devices (e.g., network interface 3040) for communicating with other systems and/or components over a communications network (e.g. Internet, LAN, etc.). For example, a client application executing on system 3000 may use network interface 3040 to communicate with a server application executing on a single server or on a cluster of servers that implement one or more of the components of the database systems described herein. In another example, an instance of a server application executing on computer system 3000 may use network interface 3040 to communicate with other instances of the server application (or another server application) that may be implemented on other computer systems (e.g., computer systems 3090).

In the illustrated embodiment, computer system 3000 also includes one or more persistent storage devices 3060 and/or one or more I/O devices 3080. In various embodiments, persistent storage devices 3060 may correspond to disk drives, tape drives, solid state memory, other mass storage devices, or any other persistent storage device. Computer system 3000 (or a distributed application or operating system operating thereon) may store instructions and/or data in persistent storage devices 3060, as desired, and may retrieve the stored instruction and/or data as needed. For example, in some embodiments, computer system 3000 may host a storage system server node, and persistent storage 3060 may include the SSDs attached to that server node.

Computer system 3000 includes one or more system memories 3020 that may store instructions and data accessible by processor(s) 3010. In various embodiments, system memories 3020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 3020 may contain program instructions 3025 that are executable by processor(s) 3010 to implement the methods and techniques described herein (e.g., various features of fine-grained virtualization resource provisioning for in-place database scaling). In various embodiments, program instructions 3025 may be encoded in native binary, any interpreted language such as Java™ byte-code, or in any other language such as C/C++, Java™, etc., or in any combination thereof. In some embodiments, program instructions 3025 may implement multiple separate clients, server nodes, and/or other components.

In some embodiments, program instructions 3025 may include instructions executable to implement an operating system (not shown), which may be any of various operating systems, such as UNIX, LINUX, Solaris™, MacOS™, Windows™, etc. Any or all of program instructions 3025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 3000 as system memory 3020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 3040.

In some embodiments, system memory 3020 may include data store 3045, which may be configured as described herein. For example, the information described herein as being stored by the database tier (e.g., on a primary node), such as a transaction log, an undo log, cached page data, or other information used in performing the functions of the database tiers described herein may be stored in data store 3045 or in another portion of system memory 3020 on one or more nodes, in persistent storage 3060, and/or on one or more remote storage devices 3070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 3045 or in another portion of system memory 3020 on one or more nodes, in persistent storage 3060, and/or on one or more remote storage devices 3070, at different times and in various embodiments. Similarly, the information described herein as being stored by the storage tier (e.g., redo log records, data pages, data records, and/or other information used in performing the functions of the distributed storage systems described herein) may be stored in data store 3045 or in another portion of system memory 3020 on one or more nodes, in persistent storage 3060, and/or on one or more remote storage devices 3070, at different times and in various embodiments. In general, system memory 3020 (e.g., data store 3045 within system memory 3020), persistent storage 3060, and/or remote storage 3070 may store data blocks, replicas of data blocks, metadata associated with data blocks and/or their state, database configuration information, and/or any other information usable in implementing the methods and techniques described herein.

In one embodiment, I/O interface 3030 may coordinate I/O traffic between processor 3010, system memory 3020 and any peripheral devices in the system, including through network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments, some or all of the functionality of I/O interface 3030, such as an interface to system memory 3020, may be incorporated directly into processor 3010.

Network interface 3040 may allow data to be exchanged between computer system 3000 and other devices attached to a network, such as other computer systems 3090 (which may implement one or more storage system server nodes, primary nodes, read-only node nodes, and/or clients of the database systems described herein), for example. In addition, network interface 3040 may allow communication between computer system 3000 and various I/O devices 3050 and/or remote storage 3070. Input/output devices 3050 may, in some embodiments, include one or more display terminals, keyboards, keypads, touchpads, scanning devices, voice or optical recognition devices, or any other devices suitable for entering or retrieving data by one or more computer systems 3000. Multiple input/output devices 3050 may be present in computer system 3000 or may be distributed on various nodes of a distributed system that includes computer system 3000. In some embodiments, similar input/output devices may be separate from computer system 3000 and may interact with one or more nodes of a distributed system that includes computer system 3000 through a wired or wireless connection, such as over network interface 3040. Network interface 3040 may commonly support one or more wireless networking protocols (e.g., Wi-Fi/IEEE 802.11, or another wireless networking standard). However, in various embodiments, network interface 3040 may support communication via any suitable wired or wireless general data networks, such as other types of Ethernet networks, for example. Additionally, network interface 3040 may support communication via telecommunications/telephony networks such as analog voice networks or digital fiber communications networks, via storage area networks such as Fibre Channel SANs, or via any other suitable type of network and/or protocol. In various embodiments, computer system 3000 may include more, fewer, or different components than those illustrated in FIG. 22 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a database service, configured to:
      receive a request to perform a restore operation to a specified point in time for a database comprising a client-managed table and a system-managed table;
      restore, from a backup copy, a metadata volume that identifies respective storage volumes for the client-managed table and a plurality of shards of the system-managed table;
      identifying respective log sequence numbers for respective redo logs for the storage volumes according to mappings that provide respective consistency points based on the mappings to and timestamps synchronized according to a time synchronization service;
      based on the identified respective log sequence numbers for the respective redo logs, determine portions of the respective redo logs to be applied to generate restored versions of the respective storage volumes for the client-managed table and the plurality of shards of the system-managed table;
      apply the determined portions of the respective redo logs to backup copies of the respective storage volumes identified from the metadata volume to generate the restored versions of the respective storage volumes for the client-managed table and the plurality of shards of the system-managed table at a consistent view for the specified point in time; and
      make the restored versions of the respective storage volumes for the client-managed table and the plurality of shards of the system-managed table available to enable access to the database restored to the consistent view for the specified point in time.

2. The system of claim 1, wherein the mappings between the redo logs and timestamps are received from a database node as part of performing a transaction on the client-managed table and the system-managed table.

3. The system of claim 1, wherein to make the restored versions of the respective storage volumes identified from the metadata for the client-managed table and the plurality of shards of the system-managed table available, the database service is configured to attach the restored versions of the respective storage volumes to respectively provisioned database nodes to allow the database nodes to access the respective restored versions of the storage volumes to perform access requests.

4. The system of claim 1, wherein to make the restored versions of the respective storage volumes identified from the metadata for the client-managed table and the plurality of shards of the system-managed table available, the database service is configured to make the restored metadata available to a provisioned router to allow the router to handle access requests to the database.

5. The system of claim 1, wherein the restored version of the system-managed table is a subset of data in the system-managed table prior to the restore operation.

6. A method, comprising:
   performing a restore operation to a specified point in time for a database comprising a client-managed table and a system-managed table, comprising:
      restoring, from a backup copy, metadata that identifies respective storage volumes for the client-managed table and a plurality of shards of the system-managed table; and
      generating restored versions from backup copies of the respective storage volumes identified from the metadata for the client-managed table and the plurality of shards of the system-managed table according to the specified point in time, wherein respective redo logs for the storage volumes include mappings to timestamps synchronized according to a time synchronization service, and wherein generating the restored versions of the respective storage volumes comprises identifying respective log sequence numbers that provide respective consistency points based on the mappings to timestamps for the respective redo logs to determine the respective portions of the respective redo logs to be applied to generate the restored versions at a consistent view for the specified point in time; and
      making the restored versions of the respective storage volumes identified from the metadata for the client-managed table and the plurality of shards of the system-managed table available to enable access to the database restored to the consistent view for the specified point in time.

7. The method of claim 6, wherein the mappings to timestamps are received from a database node as part of performing a transaction on the client-managed table and the system managed table.

8. The method of claim 6, wherein making the restored versions of the respective storage volumes identified from the metadata for the client-managed table and the plurality of shards of the system-managed table available comprises attaching the restored versions of the respective storage volumes to respectively provisioned database nodes to allow the database nodes to access the respective restored versions of the storage volumes to perform access requests.

9. The method of claim 6, wherein making the restored versions of the respective storage volumes identified from the metadata for the client-managed table and the plurality of shards of the system-managed table available comprises making the restored metadata available to a provisioned router to allow the router to handle access requests to the database.

10. The method of claim 6, wherein the restored version of the system-managed table is a subset of data in the system-managed table prior to the restore operation.

11. The method of claim 6, further comprising converting the system-managed table to be a new client-managed table as part of performing the restore operation.

12. The method of claim 6, wherein the database system is implemented as part of a provider network and wherein the backup copies of the metadata volume and the respective storage volumes are stored as part of a separate storage service in the provider network.

13. The method of claim 6, wherein the backup copies of the respective storage volumes identified from the metadata volume for the client-managed table and the plurality of shards of the system-managed table are created according to a backup policy specified for a table alignment groups that includes the system-managed table.

14. One or more non-transitory, computer-readable storage media, storing program instructions that when executed on or across one or more computing devices cause the one or more computing devices to implement:
 performing a restore operation to a specified point in time for a database comprising a client-managed table and a system-managed table, wherein, in performing the restore operation the program instructions cause the one or more computing devices to implement:
  restoring, from a backup copy, metadata that identifies respective storage volumes for the client-managed table and a plurality of shards of the system-managed table; and
  generating restored versions from backup copies of the respective storage volumes identified from the metadata for the client-managed table and the plurality of shards of the system-managed table according to the specified time, wherein respective redo logs for the storage volumes include mappings to timestamps synchronized according to a time synchronization service, and wherein generating the restored versions of the respective storage volumes comprises identifying respective log sequence numbers that provide respective consistency points based on the mappings to timestamps for the respective redo logs to determine the respective portions of the respective redo logs to be applied to generate the restored versions at a consistent view for the specified point in time; and
  making the restored versions of the respective storage volumes identified from the metadata volume for the client-managed table and the plurality of shards of the system-managed table available to enable access to the database restored to the consistent view across the client-managed table and the plurality of shards of the system-managed table for the specified point in time.

15. The one or more non-transitory, computer-readable storage media of claim 14, wherein the mappings to timestamps are received from a database node as part of performing a transaction on the client managed table and the system managed table.

16. The one or more non-transitory, computer-readable storage media of claim 14, wherein, in making the restored versions of the respective storage volumes identified from the metadata for the client-managed table and the plurality of shards of the system-managed table available the program instructions cause the one or more computing devices to implement attaching the restored versions of the respective storage volumes to respectively provisioned database nodes to allow the database nodes to access the respective restored versions of the storage volumes to perform access requests.

17. The one or more non-transitory, computer-readable storage media of claim 14, wherein, in making the restored versions of the respective storage volumes identified from the metadata for the client-managed table and the plurality of shards of the system-managed table available the program instructions cause the one or more computing devices to implement making the restored metadata available to a provisioned router to allow the router to handle access requests to the database.

18. The one or more non-transitory, computer-readable storage media of claim 14, wherein the restored version of the system-managed table is a subset of data in the system-managed table prior to the restore operation.

19. The one or more non-transitory, computer-readable storage media of claim 14, storing further program instructions that when executed by the one or more computing devices, cause the one or more computing devices to further implement converting the system-managed table to be a new client-managed table as part of performing the restore operation.

20. The one or more non-transitory, computer-readable storage media of claim 14, wherein the database system is implemented as part of a provider network and wherein the backup copies of the metadata and the respective storage volumes are stored as part of a separate storage service in the provider network.

* * * * *